(12) United States Patent
Kim et al.

(10) Patent No.: US 8,396,881 B2
(45) Date of Patent: Mar. 12, 2013

(54) METHOD AND SYSTEM FOR AUTOMATICALLY GENERATING WEB PAGE TRANSCODING INSTRUCTIONS

(75) Inventors: Sang-Heun Kim, Mississauga (CA); Charles Laurence Stinson, Mississauga (CA)

(73) Assignee: Research In Motion Limited, Waterloo (CA)

( * ) Notice: Subject to any disclaimer, the term of this patent is extended or adjusted under 35 U.S.C. 154(b) by 892 days.

(21) Appl. No.: 12/119,257

(22) Filed: May 12, 2008

(65) Prior Publication Data
US 2008/0288475 A1 Nov. 20, 2008

Related U.S. Application Data

(60) Provisional application No. 60/924,503, filed on May 17, 2007.

(51) Int. Cl.
*G06F 7/00* (2006.01)
*G06F 17/30* (2006.01)

(52) U.S. Cl. ........................................ 707/758; 707/803

(58) Field of Classification Search .................. 707/758, 707/803
See application file for complete search history.

(56) References Cited

U.S. PATENT DOCUMENTS

| | | | |
|---|---|---|---|
| 6,401,085 B1 | 6/2002 | Gershman et al. |
| 6,405,204 B1 | 6/2002 | Baker et al. |
| 6,601,100 B2 | 7/2003 | Lee et al. |
| 6,983,287 B1 | 1/2006 | Jayanti et al. |
| 7,120,702 B2 | 10/2006 | Huang et al. |
| 7,134,073 B1 | 11/2006 | Fiedorowicz et al. |
| 7,177,818 B2 | 2/2007 | Nair |
| 2002/0003547 A1 | 1/2002 | Wang et al. |
| 2002/0054090 A1 | 5/2002 | Silva et al. |
| 2002/0087643 A1 | 7/2002 | Parsons et al. |
| 2002/0120714 A1 | 8/2002 | Agapiev |
| 2002/0133484 A1 | 9/2002 | Chau et al. |
| 2002/0184266 A1 | 12/2002 | Blessin |

(Continued)

FOREIGN PATENT DOCUMENTS

| | | |
|---|---|---|
| CA | 2433375 A1 | 12/2004 |
| CA | 2622625 A1 | 3/2007 |

(Continued)

OTHER PUBLICATIONS

International Search Report issued by the Canadian Intellectual Property Office dated Aug. 14, 2008 for International Application No. PCT/CA2008/000917 filed May 12, 2008.

(Continued)

*Primary Examiner* — Kuen Lu
(74) *Attorney, Agent, or Firm* — Gowling Lafleur Henderson LLP

(57) ABSTRACT

A system and method are provided for generating transcoding instructions to identify and extract a subset of data from a web page. Input describing the subset of data is received where the input describes one or more data fields and, for each data field, respective field values from at least two sample web pages of a web page family for the web site. For each field, respective web page code defining the respective field values may be compared for commonality to find a matching pattern with which to locate the respective field values. The matching pattern comprises a signature for the data field. Transcoding instructions are defined using the matching pattern to locate and extract field values within web pages of the web page family. The subset of data may be expressed in a target format to transcode the web page for particular client machines (e.g. a wireless mobile device).

17 Claims, 12 Drawing Sheets

U.S. PATENT DOCUMENTS

| | | | |
|---|---|---|---|
| 2003/0018668 A1 | 1/2003 | Britton et al. | |
| 2003/0167209 A1 | 9/2003 | Hsieh | |
| 2003/0229900 A1 | 12/2003 | Reisman | |
| 2004/0078362 A1 | 4/2004 | Kim et al. | |
| 2004/0103091 A1 | 5/2004 | Lindblad et al. | |
| 2004/0107243 A1* | 6/2004 | Tsyganskiy | 709/203 |
| 2004/0225865 A1 | 11/2004 | Cox et al. | |
| 2004/0249824 A1 | 12/2004 | Brockway et al. | |
| 2005/0022115 A1 | 1/2005 | Baumgartner et al. | |
| 2005/0066037 A1 | 3/2005 | Song et al. | |
| 2005/0192952 A1 | 9/2005 | El-Shimi et al. | |
| 2005/0216492 A1 | 9/2005 | Singhal et al. | |
| 2005/0273772 A1 | 12/2005 | Matsakis et al. | |
| 2006/0173985 A1 | 8/2006 | Moore | |
| 2007/0033521 A1 | 2/2007 | Sull et al. | |
| 2007/0038643 A1 | 2/2007 | Epstein | |
| 2007/0067304 A1* | 3/2007 | Ives | 707/10 |
| 2007/0073758 A1* | 3/2007 | Perry et al. | 707/102 |
| 2008/0005686 A1* | 1/2008 | Singh | 715/764 |

FOREIGN PATENT DOCUMENTS

| | | |
|---|---|---|
| EP | 0811939 | 12/1997 |
| KR | 20040038458 | 5/2004 |
| WO | 0103036 A1 | 1/2001 |
| WO | 2006034038 A2 | 3/2006 |
| WO | 2007024379 A2 | 3/2007 |

OTHER PUBLICATIONS

International Search Report issued by the Canadian Intellectual Property Office dated Aug. 14, 2008 for International Application No. PCT/CA2008/000919 filed May 12, 2008.

International Search Report issued by the Canadian Intellectual Property Office dated Aug. 14, 2008 for International Application No. PCT/CA2008/000918 filed May 12, 2008.

International Search Report issued by the Canadian Intellectual Property Office dated Aug. 28, 2008 for International Application No. PCT/CA2008/000916 filed May 12, 2008.

Schaefer, Robbie, "Fuzzy rules for HTML transcoding", Proceedings of the 35th Annual Hawaii International Conference on System Sciences, Jan. 7-10, 2002, pp. 1385-1393.

International Search Report issued by the Canadian Intellectual Property Office dated Aug. 4, 2008 for International Application No. PCT/CA2008/000915 filed May 12, 2008.

International Search Report issued by the Canadian Intellectual Property Office dated Sep. 2, 2008 for International Application No. PCT/CA2008/000908 filed May 12, 2008.

Xiao-Ling, Wang et al., "Enhancive index for structured document retrieval", Proceedings of the 12th International Workshop on Research Issues in Data Engineering: Engineering E-Commerce/E-Business Systems, Feb. 24-25, 2002, pp. 34-38.

International Search Report issued by the Canadian Intellectual Property Office dated Aug. 26, 2008 for International Application No. PCT/CA2008/000907 filed May 12, 2008.

International Search Report issued by the Canadian Intellectual Property Office dated Aug. 15, 2008 for International Application No. PCT/CA2008/000914 filed May 12, 2008.

"Versatile transcoding proxy for internet content adaptation", Jung-Lee, Hsiao et al., IEEE Transaction on Multimedia, vol. 10, Issue 4, Jun. 2008, pp. 646-658.

International Search Report issued by the Canadian Intellectual Property Office dated Aug. 26, 2008 for corresponding International Application No. PCT/CA2008/000909 filed May 12, 2008.

Written Opinion of the International Searching Authority issued by the Canadian Intellectual Property Office dated Aug. 26, 2008 for corresponding International Application No. PCT/CA2008/000909 filed May 12, 2008.

Extended European Search Report issued by the European Patent Office dated Jul. 12, 2010 for corresponding European Patent Application No. 08748306.1.

Crescenzi, V. et al.; "Roadrunner: Towards automatic data extraction from large Web sites"; Proceedings of the International Conference on Very Largedata Bases, XX, XX, Jan. 1, 2001, pp. 109-118, XP002460155.

Chang Chia-Hui et al; "A Survey of Web Information Extraction Systems"; Oct. 1, 2006; IEEE Transactions on Knowledge and Data Engineering, IEEE Service Center, Los Alamitos, CA, US, LNKD-DOI:10.1109/TKDE.2006.152, pp. 1411-1428, ISSN: 1041-4347; retrieved from the internet: URL: http://www/csiencu.edu.tw/chia/pub/iesurvey2006.pdf; XP002498754.

* cited by examiner

METHOD AND SYSTEM FOR AUTOMATICALLY GENERATING WEB PAGE TRANSCODING INSTRUCTIONS

CROSS-REFERENCE

This application claims the benefit of the prior filing of U.S. Provisional Patent Application Ser. No. 60/924,503 filed May 17, 2007, the disclosure of which is incorporated herein by reference.

COPYRIGHT

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights.

FIELD

The present application relates generally to telecommunications and more particularly to a method and system for automatically generating web page transcoding instructions.

BACKGROUND

Web sites host and provide information using web pages that are communicated electronically via a telecommunications network. Accessing this information by some client computing devices can be challenging. Computing devices are becoming smaller and increasingly utilize wireless connectivity. Examples of such computing devices include portable computing devices that include wireless network browsing capability as well as telephony and personal information management capabilities.

DETAILED DESCRIPTION OF THE EMBODIMENTS

Figure 1:
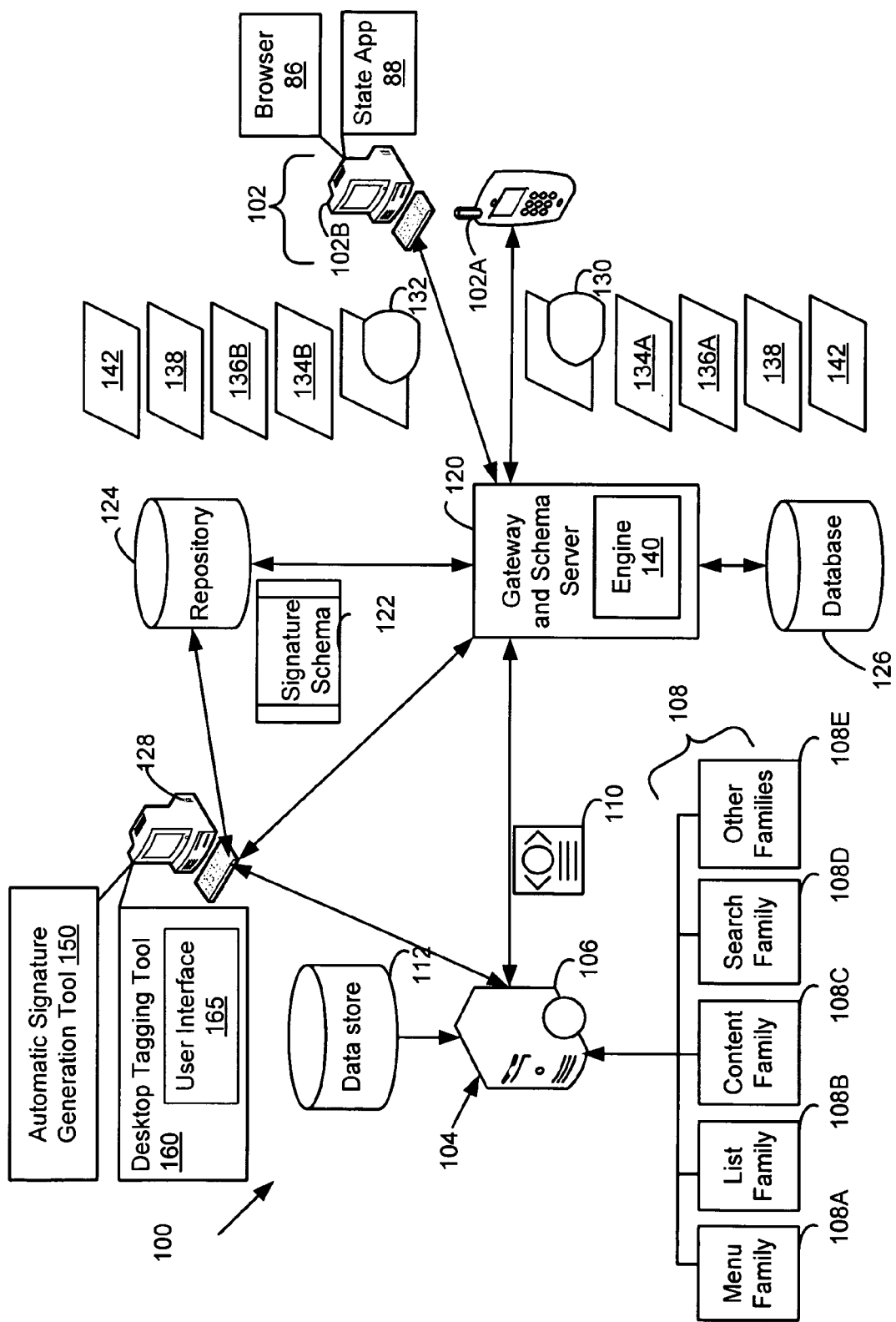
FIG. 1 is schematic representation of a system for content navigation.

The smaller size of most wireless mobile client devices necessarily limits their display capabilities. Furthermore the wireless connections to such devices typically have less or more expensive bandwidth than corresponding wired connections. The Wireless Application Protocol ("WAP") was designed to address such issues, but WAP can still provide a very unsatisfactory experience or even completely ineffective experience, particularly where the small client device needs to effect a connection with web sites that host web pages that are directed to traditional full desktop browsers.

A system and method are provided for generating transcoding instructions to identify and extract a subset of data from a web page. Input describing the subset of data is received where the input describes one or more data fields and, for each data field, respective field values from at least two sample web pages of a web page family for the web site. For each field, respective web page code defining the respective field values may be compared for commonality to find a matching pattern with which to locate the respective field values. The matching pattern may define a signature for the data field. Transcoding instructions are defined using the matching pattern to locate and extract field values within web pages of the same web page family. The subset of data may be expressed in a target format to transcode the web page for particular client machines (e.g. wireless mobile device).

In accordance with an aspect there is provided a method of automatically generating transcoding instructions to locate and extract a subset of data from a selected web page of a web site. The method comprises receiving an input describing the subset of data, said input comprising one or more data fields and, for each data field, respective field values from at least two sample web pages of a web page family for the web site; and for each data field: comparing respective web page code defining the respective field values for commonality to find a matching pattern with which to locate the respective field values, said matching pattern comprising a signature for the data field; and defining the transcoding instructions in accordance with the matching pattern to locate and extract field values for the data field within web pages of the web page family.

Comparing respective web page code defining the respective field values may comprise locating the respective field values in the respective web page code. Comparing respective web page code defining the respective field values may further comprise locating object tags within the web page code. The method may further comprising constructing a programmatic data structure representing a hierarchy of object tags within the web page code and reviewing the hierarchy to determine the commonality.

Comparing respective web page code may comprise performing pattern recognition to define a common pattern within the web page code with which to locate the respective field values.

The web page code may comprise markup language in plain text. Each signature may comprise characters selected from the plain text of the web page code.

The method may further comprising automatically defining the input in accordance with a tagging tool that identifies the respective field values from the sample web pages. The web site may comprise an e-commerce web site for making a purchase.

The method may further comprise defining transcoding instructions to express the extracted subset of data in a target format thereby to transcode the web page.

In accordance with another aspect, there is provided a system for automatically generating transcoding instructions to locate and extract a subset of data from a selected web page of a web site. The system comprises a processor and memory coupled thereto, said memory storing instructions and data to configure the processor for: receiving an input describing the subset of data, said input comprising one or more data fields and, for each data field, respective field values from at least two sample web pages of a web page family for the web site; and for each data field: comparing respective web page code defining the respective field values for commonality to find a matching pattern with which to locate the respective field values, said matching pattern comprising a signature for the data field; and defining the transcoding instructions in accordance with the matching pattern to locate and extract field values for the data field within web pages of the web page family.

Yet another aspect provides a computer program product for automatically generating transcoding instructions to locate and extract a subset of data from a selected web page of a web site, the computer program product storing computer readable instructions which when executed by a computer processor configure the processor to: A computer program product for automatically generating transcoding instructions to locate and extract a subset of data from a selected web page of a web site, the computer program product storing computer readable instructions which when executed by a computer processor configure the processor to: receive an input describing the subset of data, said input comprising one or more data fields and, for each data field, respective field values from at least two sample web pages of a web page family for the web site; and for each data field: compare respective web page code defining the respective field values for commonality to find a matching pattern with which to locate the respective field values, said matching pattern comprising a signature for the data field; and define the transcoding instructions in accordance with the matching pattern to locate and extract field values for the data field within web pages of the web page family.

Referring now to FIG. 1, there is illustrated a system 100 for content navigation via a telecommunications network. In a present embodiment system 100 comprises a plurality of client computing devices in the form of client machines 102A and 102B (collectively 102), a web site server 106 hosting a web site 104 and a gateway and schema server 120. Devices 102 are respectively coupled to communicate with gateway and schema server 120 to obtain web pages (e.g. 110) transcoded from web site 104.

In the present embodiment, a web server 106 serves web pages (e.g. 110) which comprise web site 104. The web pages are defined from a plurality of web page family templates 108A-108D (collectively 108) and web page content (described further herein below) from data store 112. For ease within the present embodiment, only a single web site 104 is shown coupled via gateway and schema server 120; however, in another embodiment a plurality of different web sites may be so coupled. In the present embodiment of system 100, gateway and schema server 120 is coupled to a schema repository 124 from which to obtain a signature schema 122 for a particular web site. Signature schema documents (e.g. 122) provide instructions and data with which an engine 140 of server 120 can extract data from web pages (e.g. 110) and transcode same to a target format to provide transcoded web page data (e.g. 130 and 132) to the respective requesting client machines 102A and 102B as described more fully below. Gateway and schema server 120 may also be coupled to a database 126 for retrieving/storing data extracted from web sites in accordance with its operations. The database 126 may be a relational database storing extracted data from web sites in relation to the defined signature schema. The stored data can be accessed by a Structured Query Language (SQL). Signature schemas for respective web sites may be defined (e.g. coded) using a computing device 128 as described herein below.

Representative client machines 102 include any type of computing or electronic device that can be used to communicate and interact with content available via web sites. Each of the client machines 102 may be operated by a respective user U (not shown). Interaction with a particular user includes presenting information on a client machine (e.g. by rendering on a display screen) as well as receiving input at a client machine (e.g. such as via a keyboard for transmitting to a web site). In the present embodiment, client machine 102A comprises a mobile electronic device with the combined functionality of a personal digital assistant, cell phone, email paging device, and a web-browser. Such a mobile electronic device may comprise a keyboard (or other input device(s)), a display screen, a speaker, (and other output device(s) (e.g. LEDs)) and a chassis for housing such components. The chassis may further house one or more central processing units, volatile memory (e.g. random access memory), persistent memory (e.g. Flash read only memory) and network interfaces to allow client machine 102A to communicate over the telecommunication network.

Figure 2:
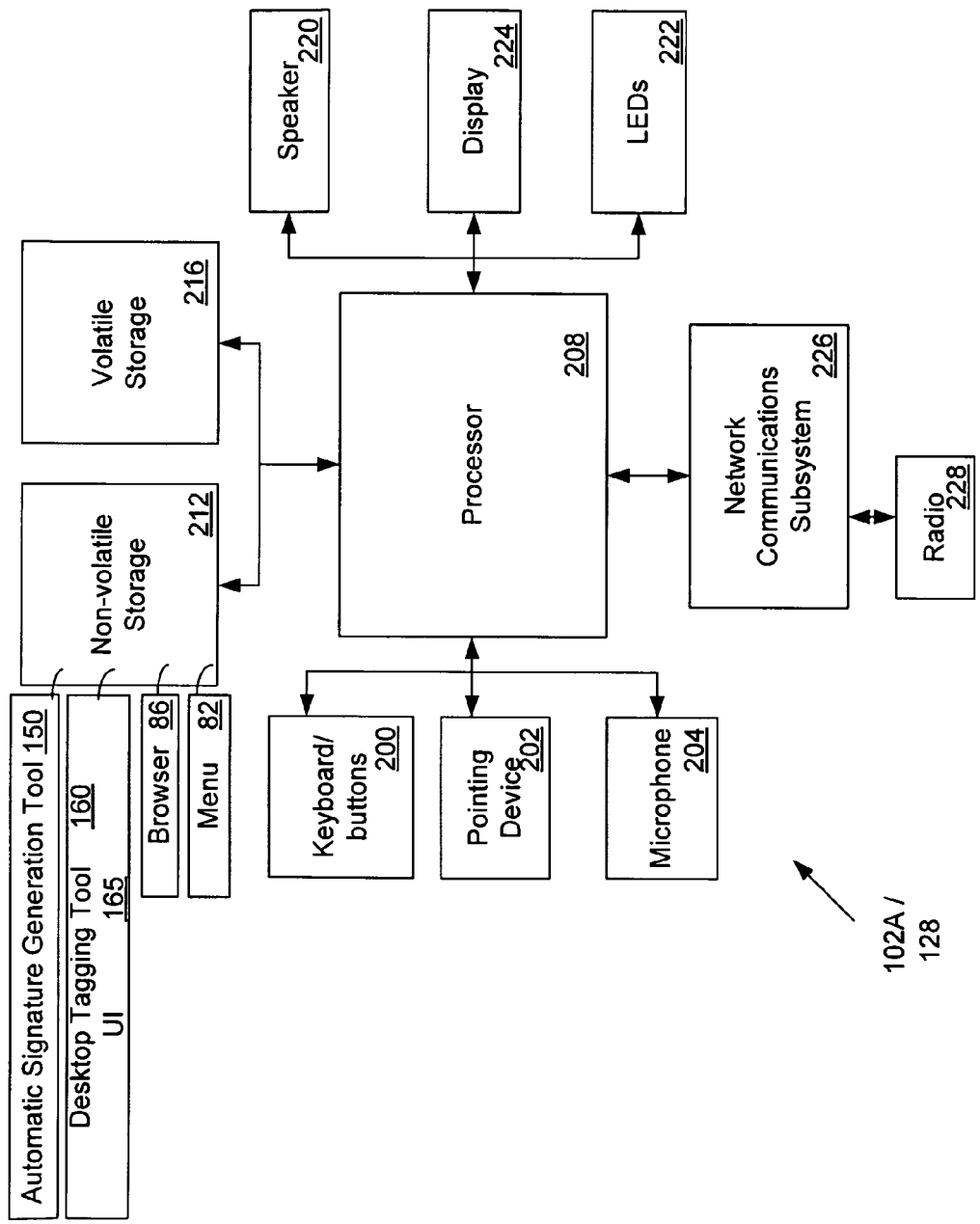
FIG. 2 is a schematic representation of a wireless communication device from FIG. 1.

Referring now to FIG. 2, a schematic block diagram shows an exemplary client machine 102A in greater detail. It should be emphasized that the structure in FIG. 2 is purely exemplary, and contemplates a device that may be used for both wireless voice (e.g. telephony) and wireless data (e.g. email, web browsing, text) communications. Client machine 102A includes a plurality of input devices which in a present embodiment includes a keyboard and, typically, additional input buttons, collectively 200, an optional pointing device 202 (e.g. a trackball or trackwheel) and a microphone 204. Other input devices, such as a touch screen, and camera lens are also contemplated. Input from keyboard/buttons 200, pointing device 202 and microphone 204 may be received at a processor 208. Processor 208 may be further operatively coupled with a non-volatile storage unit 212 (e.g. read only memory ("ROM"), Erasable Electronic Programmable Read Only Memory ("EEPROM"), or Flash Memory) and a volatile storage unit 216 (e.g. random access memory ("RAM"), speaker 220, display screen 224 and one or more lights (LEDs 222). Processor 208 may be operatively coupled for network communications via a subsystem 226. Wireless communications are effective via at least one radio (e.g. 228) such as for Wi-Fi or cellular wireless communications. Client machine 102A also may be configured for wired communications such as via a USB or other port and for short range wireless communications such as via a Bluetooth® radio (all not shown).

Programming instructions that implement the functional teachings of client machine 102A as described herein are typically maintained, persistently, in non-volatile storage unit 212 and used by processor 208 which makes appropriate utilization of volatile storage 216 during the execution of such programming instructions. Of particular note is that non-volatile storage unit 212 persistently maintains a web browser application 86 and, in the present embodiment, a native menu application 82, each of which can be executed on processor 208 making use of volatile storage 216 as appropriate. An operating system and various other applications (not shown) are maintained in non-volatile storage unit 212 according to the desired configuration and functioning of client machine 102A, one specific non-limiting example of which is a contact manager application (also known as an address book, not shown) which stores a list of contacts, addresses and phone numbers of interest to user U and allows user U to view, update, and delete those contacts, as well as providing user U an option to initiate telecommunications (e.g. telephone, email, instant message (IM), short message service (SMS)) directly from that contact manager application.

Native menu application 82 may be configured to provide menu choices to user U according to the particular application (or other context) that is being accessed. By way of example, while user U is activating the contact manager application, user U can activate menu application 82 to access a plurality of menu choices available that are respective to contact manager application 90. For example, menu choices may include options to invoke other applications (e.g. a mapping application to map a contact's address) or communication functions (e.g. call, SMS, IM, email, etc.) on the client machine 102A for a particular contact. Menu application 82 may be associated to a particular input button (e.g. one of buttons 200) and invoked to provide a contextual menu comprised of a plurality of menu choices that are reflective of the context in which the button 200 was selected. Note that the options in a contextual menu are stored within non-volatile storage 212 as being specifically associated with a respective application. Menu application 82 may be therefore configured to generate a plurality of different contextual menus that are reflective of the particular context in which the menu application 82 is invoked. For example, in an email application where an email is being composed, invoking menu application 82 would generate a contextual menu that included the options of sending the email, cancelling the email, adding addresses to the email, adding attachments, and the like. The contents for such a contextual menu would also be maintained in non-volatile storage 212. Other examples of contextual menus will occur to those of ordinary skill in the art.

As noted, gateway and schema server 120 applies a signature schema to transcode a web page and provide transcoded data to a requesting client machine 102. Signature schema 122 may be configured to transcode navigational features of a web site 104 to provide menu options to menu application 82 for use when browsing the web site 104 with browser 86. The signature schema may further transcode web site content for presentation by the browser 86.

Figure 8A:
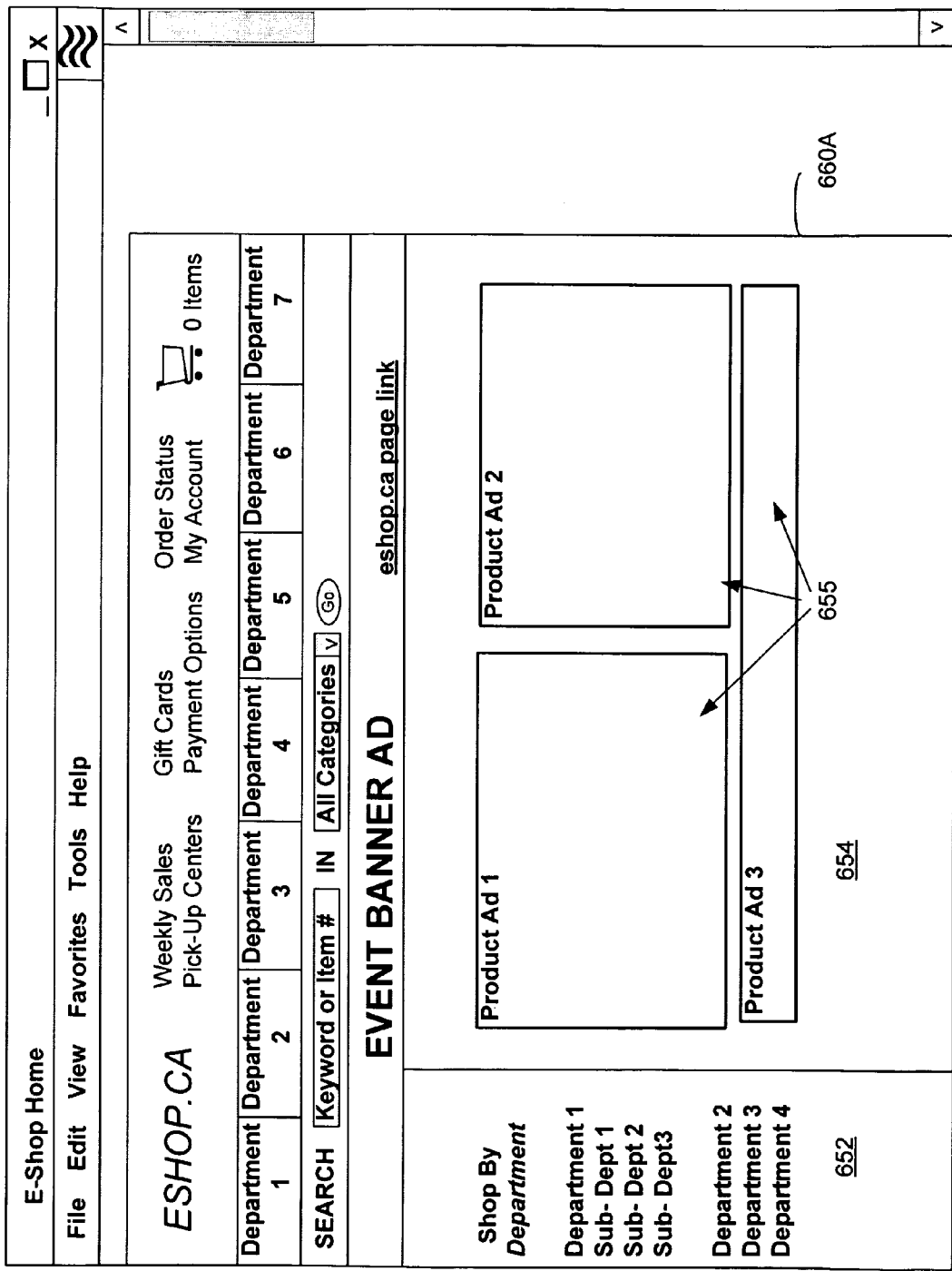
FIGS. 8A-8D and 9A-9D respectively illustrate representative web pages rendered on a first browser window and portions of said representative web pages transcoded and rendered on a second browser window in accordance with an embodiment.
Figure 8B:
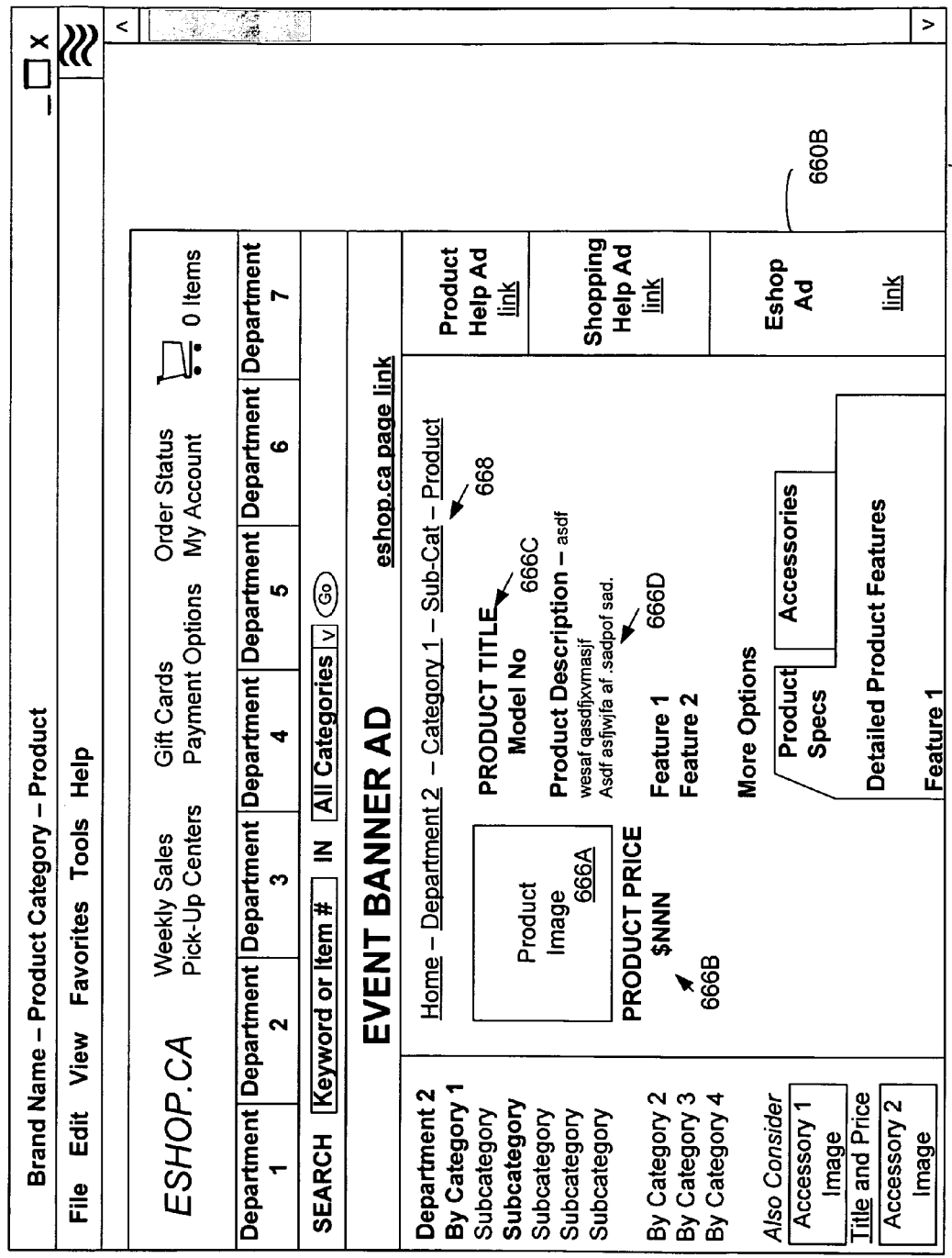
Figure 8C:
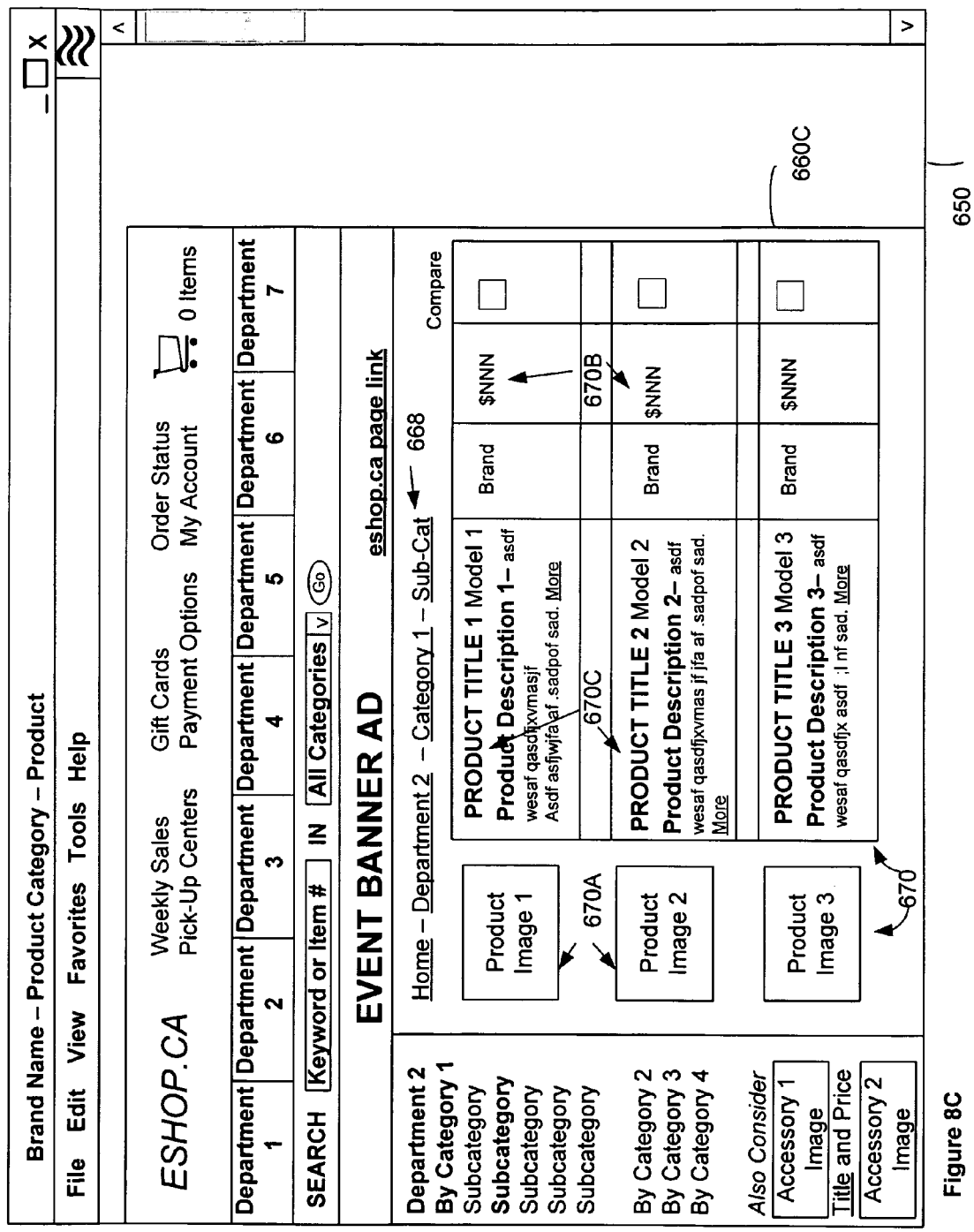
Figure 8D:
Figure 9A:
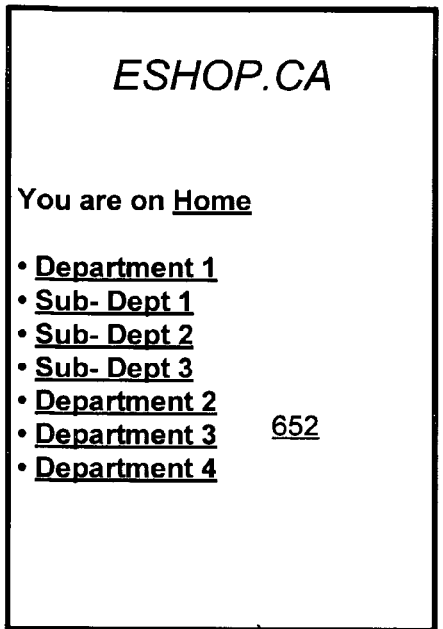

FIGS. 8A-8D and 9A-9D respectively illustrate representative web pages rendered on a first browser window and portions of a subset of data from said representative web pages transcoded and rendered on a second browser window in accordance with an embodiment. FIG. 8A illustrates a representative home web page 660A of an e-commerce web site (e.g. 104) in a browser window 650. Window 650 is illustrative of a rendering to a large size display device (e.g. desktop monitor). Web page 660A comprises, among other things, a menu portion 652 and a primary content display portion 654, in the example, showing various advertisements 655 for products. FIG. 9A illustrates the menu portion 652 extracted and transcoded and rendered as a web page on a second browser window 750. Window 750 is illustrative of a rendering to a small size display device (e.g. of a wireless mobile device). In addition to transcoding as a web page, menu portion 652 may be transcoded for menu application 82 e.g. for invocation when browsing the site 104 as referenced further herein.

Figure 9B:
Figure 9C:
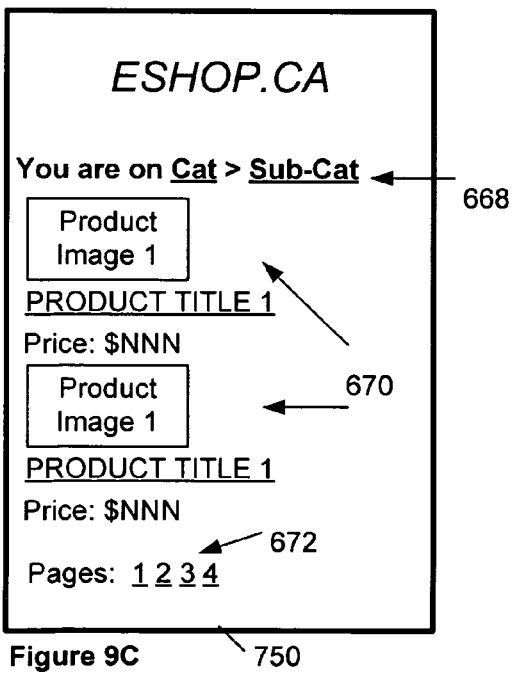

FIG. 8B illustrates an exemplary product web page 660B in window 650 showing various product data (collectively 666) including image 666A, price 666, title 666C and description 666D data that is transcoded and shown in window 750 of FIG. 9B. Also transcoded is the web page hierarchy list 668 showing where the page is on the web site.

FIG. 8C illustrates an exemplary product list web page 660C in window 650 showing a list of products (collectively 670). A subset of the product data such as image 670A, price 670B, and title 670C is transcoded and shown in window 750 of FIG. 9C. Note that multiple pages 672 may be provided for the list 670.

Figure 9D:
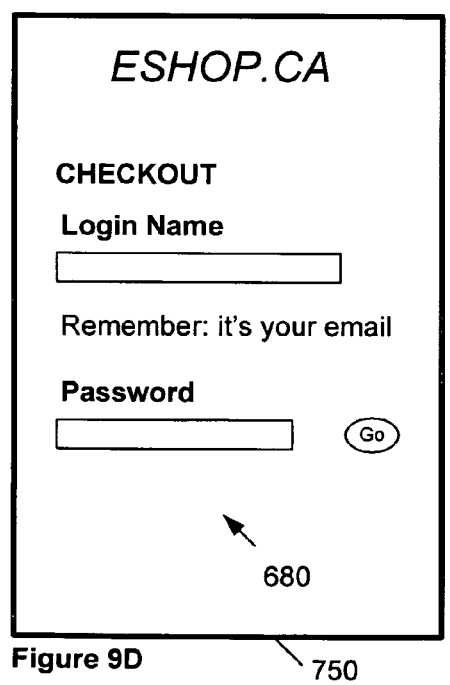

FIG. 8D illustrates an exemplary account checkout web page 660D in window 650 showing a login form 680 for receiving account login and password, which form is transcoded and shown in window 750 of FIG. 9D. Though not shown, other checkout pages (e.g. for payment or order confirmation, etc.), search pages, product and information pages may be similarly transcoded.

Returning now to FIG. 1, web server 106 and gateway and schema server 120 (which can, if desired, be implemented on a single server) can be based on any commonly available server environments or platforms including a module that houses one or more central processing units, volatile memory (e.g. random access memory), persistent memory (e.g. hard disk devices) and network interfaces to allow servers 106 and 120 to communicate over the telecommunications network. Web server 106 hosts software applications comprising instructions and data for generating and serving web pages dynamically from the template families 108 and current informational content therefore from data store 112. Load balancing, security/firewall, billing, account and other applications may also be present.

Gateway and schema server 120 hosts software applications comprising instructions and data for proxying requests and responses between the client machines 102 and web site 104. In addition to software for maintaining HTTP communications, performing requests, maintaining sessions, handling cookies, etc., engine 140 may be implemented in software to apply the signature schemas to web pages from web sites. There may be provided an interpreter that interprets the signature schema document and applies the actions against the web page code (as an ASCII (plain text) document) to extract the subset of data to produce a result set. A renderer may be provided to express the subset of data result set (i.e. transcode to a target format such as cHTML (Compact HTML) for a mobile device browser) for transmitting to the client machines also in accordance with the signature schema. A cache feature may also be provided for storing/retrieving data from database 126. Caching may comprise storing web pages from the web site as well as extracted data from which to build a relational database of object and elements and their relationships. The gateway and schema server (or a separate server (not shown)) may host a web site engine to provide content extracted from the relational database (e.g. stored web site data) to the client machines 102.

Devices 102, schema server 120 and web site 104 are coupled via a telecommunication network (not shown) typically comprising a plurality of interconnected networks that may include wired and (at least for device 102A) wireless networks. It should now be understood that the nature of the network is not particularly limited and is, in general, based on any combination of architectures that will support interactions between client machines 102 and servers 106 and 120. In a present embodiment the network includes the Internet as well as appropriate gateways and backhauls.

More specifically, in the present embodiment, a wireless network for client machine 102A may be based on core mobile network infrastructure (e.g. Global System for Mobile communications ("GSM"), Code Division Multiple Access ("CDMA"), Enhanced Data rates for GSM Evolution ("EDGE"), Evolution Data-Optimized ("EV-DO"), High Speed Downlink Packet Access ("HSPDA"), Universal Mobile Telecommunications System ("UMTS"), etc.) or on wireless local area network ("WLAN") infrastructures such as the Institute for Electrical and Electronic Engineers ("IEEE") 802.11 Standard (and its variants) or Bluetooth or the like or hybrids thereof. In the present embodiment of system 100 it is contemplated that client machine 102B may be another type of client machine such as a PC (desktop or laptop) configured to include a full desktop computer or as a "thin-client". Typically such have larger display monitors/ screens than portable machines like 102A. A wired network for system 100 and device 102B can be based on a T1, T3 or any other suitable wired connection.

As previously stated in relation to FIGS. 1 and 2, each of the client machines 102 is configured to interact with content available over the network, including web pages on web site 104. In a present embodiment, client machines 102A and 102B may navigate for content using a browser application (e.g. 86). As will be explained further below, on client machine 102A, browser application 86 may be a mini-browser in the sense that it may be configured to render web pages on the relatively small display 224 of client machine 102A. Often, during such rendering, those pages are presented in a format that may be different from how those pages are rendered on a traditional desktop browser application (e.g. browser 86 of client machine 102B). Mini-browsers typically attempt to convey substantially the same information as if the web pages had been rendered on a full browser such as Internet Explorer®, Safari® or Firefox® on a traditional desktop or laptop computer like client machine 102B.

Figure 3:
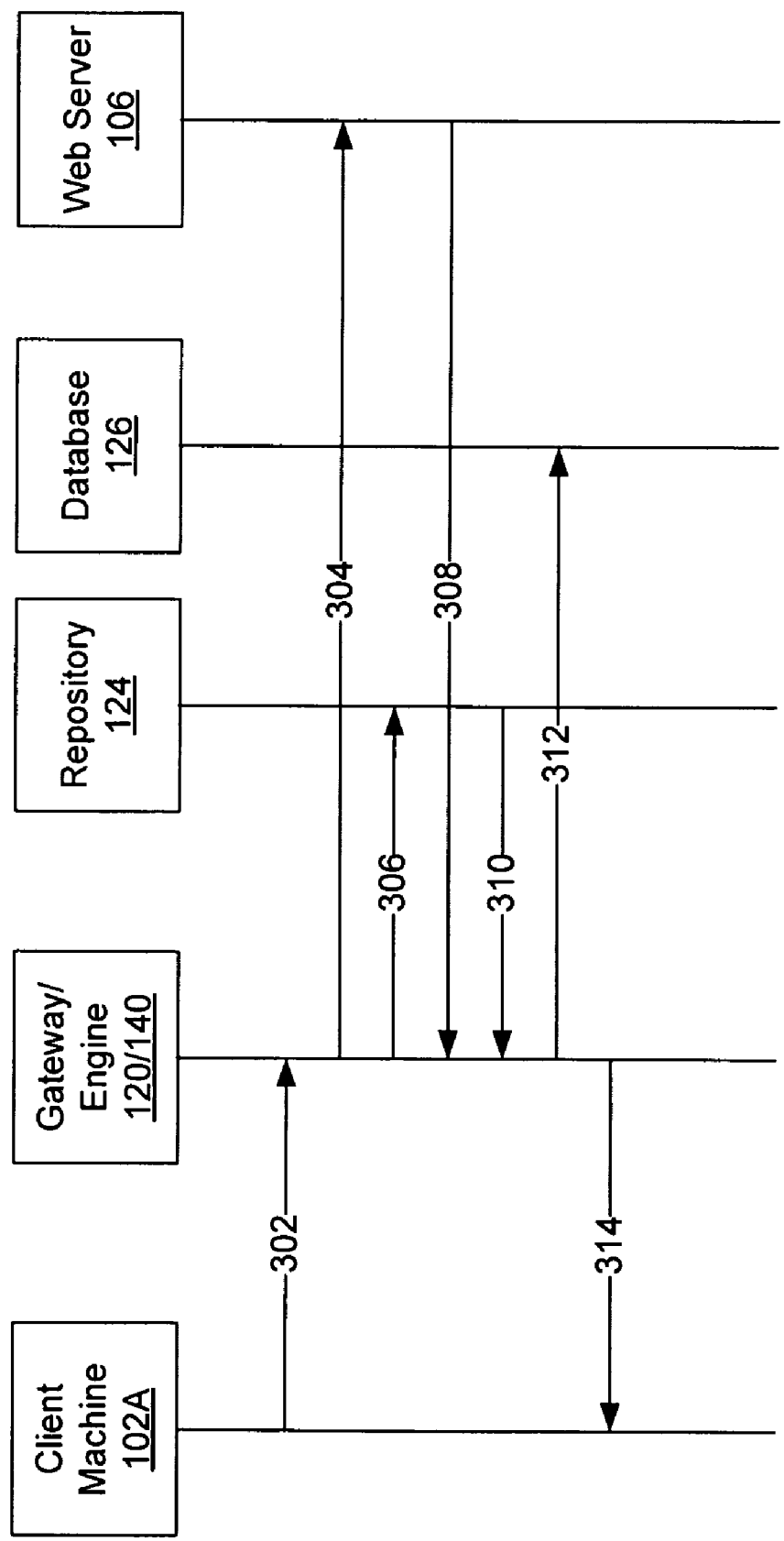
FIG. 3 illustrates a flow of interactions among components of the system of FIG. 1.

FIG. 3 is a flowchart illustrating operations/interactions for transcoding a web page (e.g. 110) from web site 104 for client machine 102A, providing an example of the interaction among the gateway and schema server 120, client machine 102A and the web site 104. Client machine 102A makes a request 302 to server 120, acting as a proxy, for a specific web page (e.g. 110) from a web site having a specific domain (URL). The gateway and schema server engine 140 receives the request and makes a corresponding request 304 as a proxy to the web site's web server 106 for the specified page, receiving 308 the web page code (e.g. 110) into the engine's (140) memory. The web page code is treated as an ASCII (plain text) file. It typically does not include objects referenced by the code such as images, video, audio, further web pages, etc. that are typically subsequently retrieved and inserted at the time of rendering a web page by a browser.

The engine 140 (for example, in parallel or without waiting for a response from server 106) makes a request 306 to the signature repository 124 for the signature schema document 122 for the web site, which request may use the domain in the URL as an identifier for obtaining the document 122. The engine 140 receives 310 the schema. The engine 140 does not render the web page 110 per se but instead uses the instructions in the signature schema document 122 to extract the subset of data from the web page 110 for transcoding. In the present embodiment signature schema 122 is configured to transcode the web page 110 in accordance with the specific characteristics of the requesting client device 102A, having knowledge of display 224 capabilities—such as screen size, resolution, and other parameters—useful in determining the way in which the transcoded data is to be displayed on the machine 102A.

Optionally, the web page 110 or extracted data or both can be stored 312 in database 126. Engine 140 transmits 314 the transcoded data 130 that has been extracted and transcoded to a target format from web page 110, in accordance with the schema 122, to the requesting client machine 102A. As noted above, transcoded data 130 may comprise transcoded navigational data for menu application 82 and informational content data (e.g. a list of products and related information from a web page) for displaying by browser application 86.

Signature schemas are pre-defined documents, and may be eXtensible Markup Language (XML) documents utilizing an SQL-like query language, to incorporate instructions and data with which to intelligently extract the data from web pages (which web pages are typically coded in HTML, DHTML, XHTML, XML, RSS, JavaScript, etc). This extracted data may be transcoded and provided to client machines 102, or used to dynamically generate a relational database (e.g. 126) or both. Each signature schema incorporates an understanding of a particular web site's data including relationships among the various data (e.g. among its primary informational content found in the body of its web pages as well as among such content and associated navigational data (e.g. web page links) that govern the data in the page). As described further herein below, prior knowledge of the web page code including specific identifiers, tags and text (i.e. strings) used within the code (sometimes referred to as "signatures" herein), may be used to define instructions to identify portions of the code of interest and to extract specific data.

As a further feature, transcoding may be configured to provide continuity of browsing/transactional/session experience enabling a user to switch client machines (e.g. starting with client machine 102A and switching to machine 102B (or vice-versa)). A user may be enabled to start an interaction with a web site and have displayed data (published content and navigational data) on the client machine 102A. The browsing session may then be continued on a second client machine (102B) while retaining the transcoding as provided to the first client machine. For example, a user on a desktop can continue to browse the published content and navigational data of the web site as previously experienced on a mobile device, using only a portion of the desktop screen (for example) for data display.

In accordance with the present embodiment, a signature schema document may be defined for all the pages of a particular web site. Large data-driven web sites (e.g. 104) don't maintain thousands of individual web pages per se. The sites typically adopt a few page family templates 108 and dynamically populate these with pertinent content from database 112 comprising information (e.g. weather, stock data, news, shopping/product data, patent data, trade-mark data etc.) as applicable when a client requests a particular page. Each template represents a family of pages having objects and attributes. Below are representative example page family templates and their objects and attributes for a web site offering news and an e-commerce web site offering products for sale electronically:

Example 1

News Site

Family: List Page

Objects: lists a selection of news stories

Attributes: Title, abstract and date

Family: Detail page

Objects: lists a single news story (and optionally other related stories)

Attributes: Journalist, City, Date, Title, Full Story, Image

Example 2

E-Commerce Site

Family: List Page

Objects: lists a selection of products

Attributes: Image, Item Name, Price, Sale Price

Family: Search Page (a specific kind of list page)

Objects: Similar to a list page

Each family of pages (the family template) can be identified by a "signature" or unique set of one or more features that automatically identifies a given page on a web site as part of the family and differentiates that family from another family of pages. Similarly each object and attribute field of interest can be identified with its respective unique signature within a family of pages. A signature schema document typically comprise numerous pieces of information (commands), for example, information that instructs the engine 140 for:

identifying all page families;

identifying and extracting a subset of data (i.e. desired objects and attributes) for each page family;

capturing the (implicit or explicit) relationships between the objects and attributes; and transcoding the data.

A signature schema document may also be configured to enable special functionality for the target web site including searching, logging in a user, purchasing items, etc.

In accordance with a present embodiment, the structure and syntax of a representative signature schema document for a representative e-commerce site eshop.ca is shown and described. Engine 140 may be configured to receive web page code comprising text data and search through the text in accordance with the schema document instructions that provide SQL-query like language instructions. Engine 140 maintains a pointer within the text as it moves through the web page code performing various actions, as described below, in accordance with the schema instructions. Table 1 illustrates a snippet of a representative signature schema:

TABLE 1

XML Signature Schema Snippet for E-Shop.ca

```
1   <?xml version="1.0" encoding="ISO-8859-1" ?>
2   <site>
3     <version major="1" minor="2"/>
4     <url location="http://www.eshop.ca" key="eshop.ca" name="E-Shop" />
5     <advanced>
6
7       <index_link value="http://www.eshop.ca/home.asp" />
8     </advanced>
9     <page_type>
10      <lookup type="pex" action="locate_string" name=
           "list_elements" id="mylist_1" ref="Compare products"
           alt1="Sort products" />
11      <lookup type="pex" action="locate_string" name="item_elements"
           id="myitem_1" ref=""product-details"" />
12      <lookup type="pex" action="locate_string" name="menu_elements"
           id="mymenu_2" ref="anc-lhsnav-subItem" />
13      <lookup type="pex" action="locate_string" name="menu_elements"
           id="mymenu_1" ref="product-table" />
14      <lookup type="pex" action="locate_string" name="item_elements"
           id="myitem_1" ref="*" />
15    </page_type>
16    <list_elements id="mylist_1">
      ...
17    </list_elements>
      ...
18    <item_elements id="myitem_1">
19      <actions>
20        <lookup type="pex" action="move_ptr" ref="</head>" />
21      </actions>
22      <element>
23        <lookup type="pex" action="get_string" name="image"
             ref="largeimageref" location="after" start="<img src=""
             end=""" />
24        <lookup type="pex" action="get_string" name="title" ref="product-
             details-prd-title" location="after" start="<span"
             end="</span>" include_sz="1" strip_tags="1" />
25        <lookup type="pex" action="get_string" name="price" ref="our price:"
             location="after" start="<td" end="</td>" include_sz="1"
             strip_tags="1"/>
26        <lookup type="pex" action="get_string" name="sale_price"
             ref="sale price:" location="after" start="<td" end="</td>"
             include_sz="1" strip_tags="1" tolerance="1" />
27        <lookup type="pex" action="get_string" name="description"
             ref="detailbox-text" location ="middle" start="<p"
             end="</p>" include_sz="1" strip_tags="1" />
28      </element>
29    </item_elements>
      ...
```

In the XML code snippet of Table 1, instructions at line 4 are for verifying that the web page under consideration and the signature schema relate to the same web site/domain—eshop.ca. Instructions at lines 9-15 are for determining the particular page family to which the web page under consideration belongs. A respective signature that defines the particular page family has been previously identified for use to distinguish the page. The engine 140 processes the  tag by registering the identification strings for each page family. When a web page is obtained by the engine as input, the engine may be able to identify the page family by its unique string ref="" and the command provides the related tag within the signature schema document where further instructions for the particular web pages are found:

action="locate_string": command to check for the existence of a string.

name="": identifies the type of page family for each identified family.

id="": assigns an id to the page family that is used across the signature schema document.

For example, at line 10, the instructions identify a web page using the alternative signatures "Compare products" or "Sort Products". Web pages with these strings are of the same family type. The instructions at line 10 provide a reference tag to further instructions for this family, providing a link to instructions for the list_elements page family with and ID of mylist_1 (see lines 16-17). Similarly the other lookup instructions provide references to the specific instructions within the signature schema document for handling a web page of each web page family. Representative instructions for some of the web page families are provided in Table 1, for example, at lines 16-17 and 18-29 with others omitted for brevity.

With reference to the extraction instructions for one of the web page families (e.g. item_elements id="myitem_1") at lines 18-29, the instruction at line 20 advances the scan pointer within the text file of the web page code to a beginning limit of a region of interest indicated by a signature reference. This establishes an upper limit for review within the text file. Though not shown in this table, an end limit may be defined as well (See Table 4). Further such instructions at lines 22-28 may comprise commands to locate the subset of data using "signatures" such as string identifiers that uniquely identify the data within the region of interest. In the present example the instructions locate and extract a plurality of elements, namely, product image, title, price, sale price and description for a product of the item web page family. For example, instructions at line 23 extract a string in between the first "<img src="" and """ that appears after next appearance of "largeimageref". The string returned is the path (relative URL at web site eshop.ca) to the product image. By advancing a search scan pointer within the web code to a particular location, references before that location can be skipped when searching. Any prior instances of a signature string such as "largeimageref" may be ignored. In this way, otherwise ambiguous signature references can be avoided.

The example in Table 1 shows at least some of the instructions (e.g. lines 23-27) including one or more directional references relative to the signatures to locate and extract the subset of data. For example, directional references such as "before" or "after" command the engine to extract the data that is in a relative position in the web page before or after the signature string (i.e. ref=). Moreover, such instructions may further include at least one of a start reference or an end reference further pinpointing the location of the data in accordance with that direction. Additional directional reference information is discussed herein with reference to code snippets in other Tables and the discussion of an embodiment of signature transcoding engine syntax presented below.

The example within Table 1 demonstrates the extraction of data and the establishment of relationships between objects and elements within a same page of a web site. However, signature schema documents may further capture relevant attributes of an object across pages. For example, a user of client machine 102A may click through a number of web pages in eshop.ca to get to a specific product page (e.g. Department→Product Category→Product Sub-Category→Specific Product, such as TV & Video>19'-21" TVs>LCD TVs>BrandX Product. The navigational hierarchy representing a categorization may be captured and associated to the extracted objects and there elements.

For brevity, certain instructions were omitted from Table 1. Tables 2-4 provide representative instructions for further web page families for e-shop.ca that may be read with Table 1. Table 2 below provides representative instructions, e.g. for lines 16 and 17 of Table 1, including instructions for a web page family related to a list of items/products for sale. Whereas instructions at lines 22-28 provided product data extraction instructions for a web page family showing a single item (i.e. product), the instructions of Table 2 provide additional instructions that repeat product data extractions for each product in the list.

TABLE 2

| | XML Signature Schema Snippet for Product List Page Family of E-Shop.ca |
|---|---|
| 1 | <list_elements id="mylist_1"> |
| 2 |   <paging> |
| 3 |     <page_variable value="page" /> |
| 4 |      |
| 5 |     <lookup type="pex" action="get_string" name="link" ref="Next&nbsp" location="before" start="<a class=" end="</a>" include_sz="1" strip_tags="1" /> |
| 6 |   </paging> |
| 7 |   <actions> |
| 8 |     <lookup type="pex" action="move_ptr" ref="Sort or compare products" ref_alt_1="Sort products" /> |
| 9 |   </actions> |
| 10 |   <element> |
| 11 |     <lookup type="pex" action="get_string" name="link" ref="thumbnail" location="before" start="<ahref="" end="">" /> |
| 12 |     <lookup type="pex" action="get_string" name="image" ref="thumbnail" location="middle" start=""" end=""" /> |

TABLE 2-continued

XML Signature Schema Snippet for Product List Page Family of E-Shop.ca

```
13      <lookup type="pex" action="get_string" name="title"
            ref="class="tx-strong-dgrey&quot;" location="after"
            start="<a href=" end="</a>" include_sz="1"
            strip_tags="1" />
14      <lookup type="pex" action="get_string" name="price" ref="pricepill/"
            location="after" start="/" repeat_start="1" end=".gif"
            tolerance="1" />
15      <lookup type="pex" action="move_ptr" ref="pricepill/" />
16    </element>
17  </list_elements>
```

If the engine 140 identifies that the page is of the "mylist_1" family, the engine determines the location in the signature schema document that contains the signature for the objects and elements of that family and applies the instructions therefor. A product list at e-shop.ca may span multiple web pages. Instructions at lines 2-6 of Table 2 find the number of pages and generate the links for each of the pages. Instructions at lines 7-9 (action tag) advance the search scan pointer to the region of web page code that may be of interest (i.e. in this case, the start of the list). In this way, a local signature reference can be used and any earlier ambiguous references skipped. Skipping to the local region of interest may also make the specification of the signature reference less complicated.

Taking advantage of inherent repeated patterns in the web page code, instructions at lines 10-16 (elements tag) of Table 2 provide product data extraction instructions that may be repeated for each product in the list. The engine 140 may be provided with commands to scan for each data element of interest using a signature reference e.g. ref="", an action, one or more positional instruction(s) to further identify the data within the text of the web page code, and any additional text data manipulation instructions to extract the data (e.g. to remove HTML formatting characters or add characters). The instruction at line 15 moves the scan pointer to the end of the object (in this example a product in a list of products) to ready the instructions for application against the next object (product) in the list.

More particularly:

lookup type="pex": string lookup action="get_string": returns a value back that is the desired element of the object.

name="link": the object element, in this case the link to the product page ref="thumbnail": the reference string that identifies where to find the value of the link location="before": the value of the link is before the ref string start="<a href="": look for the ref string after this value end="">": look for the ref string before this value.

TABLE 3

E-Shop Search Family Signature Schema Snippet

```
1   <search_elements id="mysearch_1">
2     <settings>
3       <search_path value="http://www.eshop.ca/search/search.asp"/>
4       <search_variable value="keyword" />
5     </settings>
6     <paging>
7       <page_variable value="page" />
8       <page_start value="0" />
9       <lookup type="pex" action="get_string" name="link" ref="Next&nbsp"
            location="before" start="<a href=" repeat_start="1"
            end="</a>" include_sz="1" strip_tags="1" />
10    </paging>
11    <actions>
12      <lookup type="pex" action="move_ptr" ref="bg-compare-hero" />
13    </actions>
14    <element>
15      <lookup type="pex" action="get_string" name="link" ref=">"
            location="after" start="<a href="" end="">" />
16      <lookup type="pex" action="get_string" name="image" ref="<a href"
            location="after" start="<img src="" end=""" />
17      <lookup type="pex" action="get_string" name="title"
            ref="class="tx-strong-dgrey&quot;" location="after"
            start="<a href=" end="</a>" include_sz="1" strip_tags="1" />
18      <lookup type="pex" action="move_ptr" ref="bg-compare-hero" />
19    </element>
20  </search_elements>
```

If the engine 140 has identified that the page is of the "mysearch_1" family the engine applies the portion of the signature schema document that contains the signature for the objects and elements of that family, shown above in Table 3.

<settings> . . . </settings>: Contains any web page specific manual overrides such as excluding certain menu items, customization, modification of a menu that may be desired. In this example, as per line 3 a value of form variable "keyword" will be posted to "http://www.eshop.ca/search/search.asp".

\<paging\> . . . \</paging\>: Manages paging for the search pages.

\<actions\> . . . \</actions\>: Instruct the engine to move the scan pointer to the string "bg-compare-hero" (line 12 of Table 3) and start looking for elements from there.

\<element\> . . . \</element\>: Contains lookup instructions for each object element as previously described.

TABLE 4

E-shop Menu Family Signature Schema Snippet

```
1   <menu_elements id="mymenu_1">
2     <settings>
3       <black_list value="Site Index##External Link" />
4     </settings>
5     <actions>
6       <lookup type="pex" action="move_ptr"
            ref="bg-lhsnav-title" />
7       <lookup type="pex" action="end_ptr" ref="</table>" />
8     </actions>
9     <element>
10      <lookup type="pex" action="get_string"
            name="link" ref="<li>"
            location="after" start="<a href="" end=""" />
11      <lookup type="pex" action="get_string"
            name="title" ref="<li>"
            location="after" start="<a href="" end="</a>"
            include_sz="1" strip_tags="1" />
12      <lookup type="pex" action="move_ptr" ref="</li>"/>
13    </element>
14  </menu_elements>
```

If the engine 140 has identified that it is looking for a menu on a page that contains the menu style of the "mymenu_1" family, the engine applies the portion of the signature schema document that contains the signature for the objects and elements of that family, shown above in Table 4.

\<settings\> . . . \</settings\>: Contains any page specific manual overrides such as exclude list, customization, modification, personalization, etc. In this example, as per line 3, any result that matches "Site Index", "External Link" are excluded but partial matches are also possible by using wild card strings.

\<action\> . . . \</action\>: Lines 6-7 of Table 4 sets the start and end limits to instruct the engine 140 where to look for menu items.

\<element\> . . . \</element\>: Contains lookup instructions for each object element as previously described. In this example, lines 10 and 11 of Table 4, an element in 'mymenu_1' (each individual menu entry of web page) contains link and title as its properties. Line 12 instructs the engine to move the pointer to "</li>" to get ready to loop through and extract the next menu item with the same elements, taking advantage of the repeated patterns within the text of the web page code.

Though the example described relates to extracting informational content for an e-commerce oriented site, no limitation should be applied. Similar instructions may be defined for other types of sites, for pages which permit a user to input information and for navigational data extraction.

Signature schema document 122 may further comprise transcoding instructions (not shown) for use by engine 140 to express the extracted subset of data in a target format (e.g. a format of HTML, XML, script etc.) for use by the requesting client machine 102. For example, the transcoding instructions may define a web page for displaying the extracted data in browser application 86 that is suitable for display on the client device 102. The formatting rules can be system and/or user defined and can include parameters such as but not limited to: object positioning, object colour, object size, object shape, object font/image characteristics, background style, and navigational item display (e.g. in a menu as described above) or for display with the content in the generated page on the client screen. Browser application 86 (e.g. of machine 102A) may be configured for using a markup language (e.g. cHTML) or other code format that is not identical to the code provided by web page 110. Alternatively, transcoding instructions may be defined to express the extracted subset of data in XML or another code format such as for use by a different client application or plug-in to a client application such as menu application 82 or another application (not shown) on client machine 102.

Signature schema documents may be prepared (i.e. coded) using a computing device such as computing device 128. Computing device 128 may be any suitable desktop or laptop device capable of coding documents (which may be but need not be XML-type documents) and may be configured to automate or semi-automate coding of such documents.

Computing device 128 may be coupled to web site 104 to retrieve web pages from the site for reviewing to prepare the custom signature schema document for the site. Computing device 128 may be configured to automatically review the web page code and apply heuristics or other techniques (e.g. spatial analysis) to determine probable content of interest (i.e. subset of data) and generate code to extract the subset of data. For example, primary content of interest tends to be located toward the centre of the web page. In another embodiment, the computing device may facilitate a user coding signature schema to manually assist with the analysis of the web page and identification of subset of data and the generation of the instructions. Computing device 128 may be further coupled to repository 124 to provide (e.g. up-load or publish) coded signature schema documents for use by server 120.

Automatic Generation of Signature Schema 122

Figure 7:
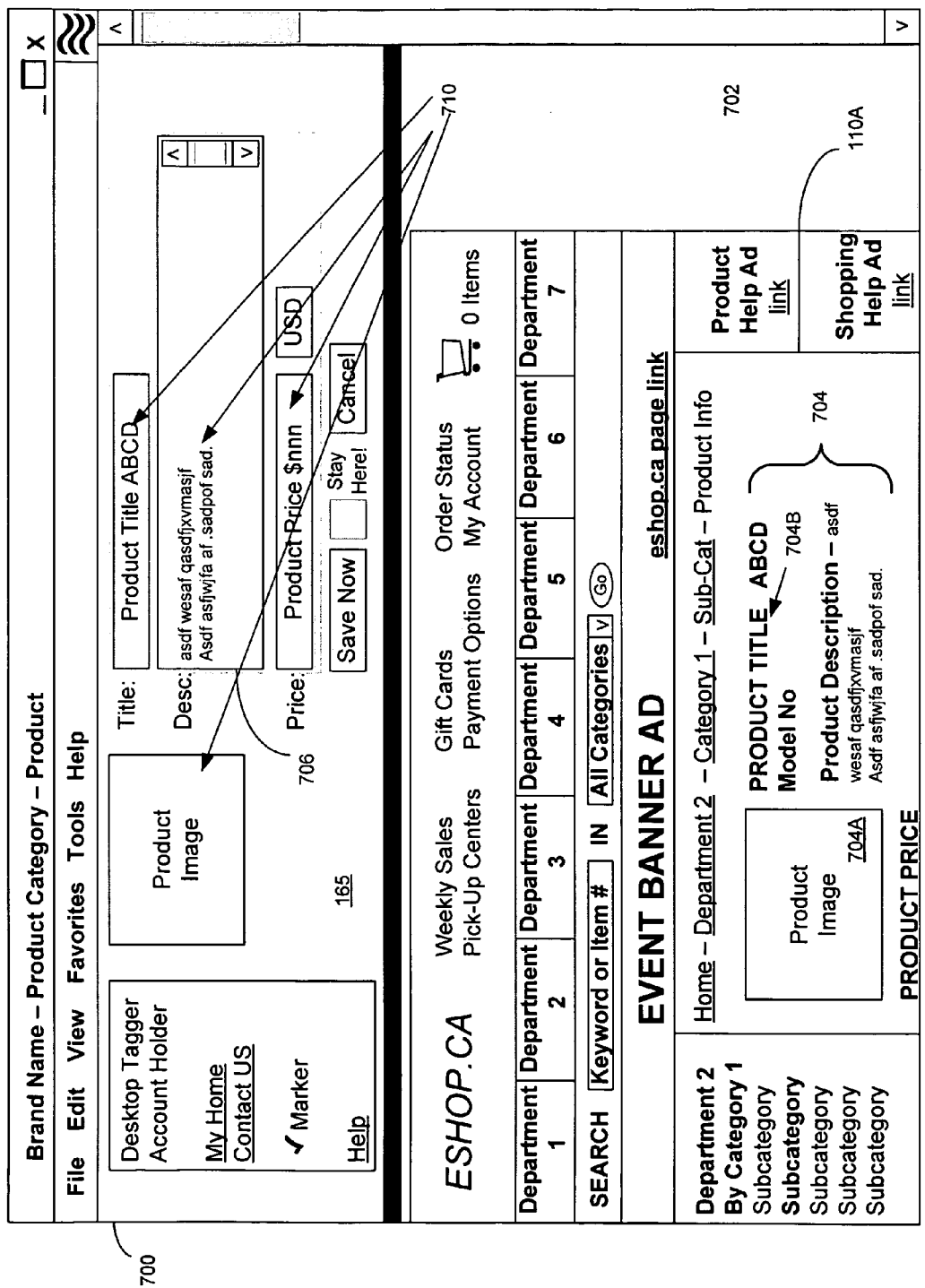
FIG. 7 illustrates an exemplary view of a user interface of a desktop tagging tool for indentifying a subset of data on a web page in accordance with an embodiment.

Referring to FIGS. 1 and 7, in one embodiment, the computing device 128 of system 100 comprises an automatic signature generation tool 150 for preparing a custom signature schema document for web pages of a web site. Computing device 128 may further comprise a desktop tagging tool 160 having a graphical user interface 165 (which may be adapted to cooperate with a web browser application) for assisting a user to identify the desired data (e.g. product title, image, description and price data) in a web browser window 700. User interface 165 may comprise a portion of the window while the remaining portion 702 displays the rendered web page 110A for which a signature schema is to be constructed. User interface 165 may present a form 706 showing the desired data (fields and values therefor) where candidate data values 710 from data 704 of the web page 110A populates the form 706. User interface 165 may facilitate confirming or amend the candidate data values. For example, data replacing the candidate data 710 may be selected and captured (not shown) from the rendered web page 110A through "drag and drop" or highlighting/copying user gestures.

User interface 165 may be predefined to present candidate desired data (i.e. for particular desired data types that are expected to be found on web pages for such web sites of a similar genre). That is, a user interface 165 for an e-commerce web site selling products may be defined to present "product title", "image", "price", etc. If a particular candidate value was incorrect, for example, product image 704A, title 704B, etc., such may be selected and dropped or copied into form 706 of interface 165. Optionally, the interface may permit the user to add data types (fields and field values) to the presented data. In association with these actions, tool 160 examines the associated HTML source code/tags of the rendered web page for capturing this data. Desktop tagging may be useful to assist with the identification of the desired data within the web page code so that signatures therefor within the web page code of similar pages may be determined for defining the signature schema documents.

Although the desktop tagging tool 160 and the automatic signature generation tool 150 are described in relation to computing device 128, it will be understood that any one of the client machines 102 may be configured to comprise the tools 150 and 160. Further, it will be understood that the exemplary operation of the automatic signature tool 150 may be implemented similarly on the client machines 102. Similarly, the flow of interactions may apply similarly for either one or both of the computing device 128 or the client machine 102.

Although signature schema documents 122 may be manually coded, these activities may be time consuming and subject to human error. Therefore, by providing an automatic signature tool 150 to automate coding of signature schema, transcoded web pages (e.g. 130, 132), and thus transcoded web sites, may be readied for use faster and more reliably.

Figure 6:
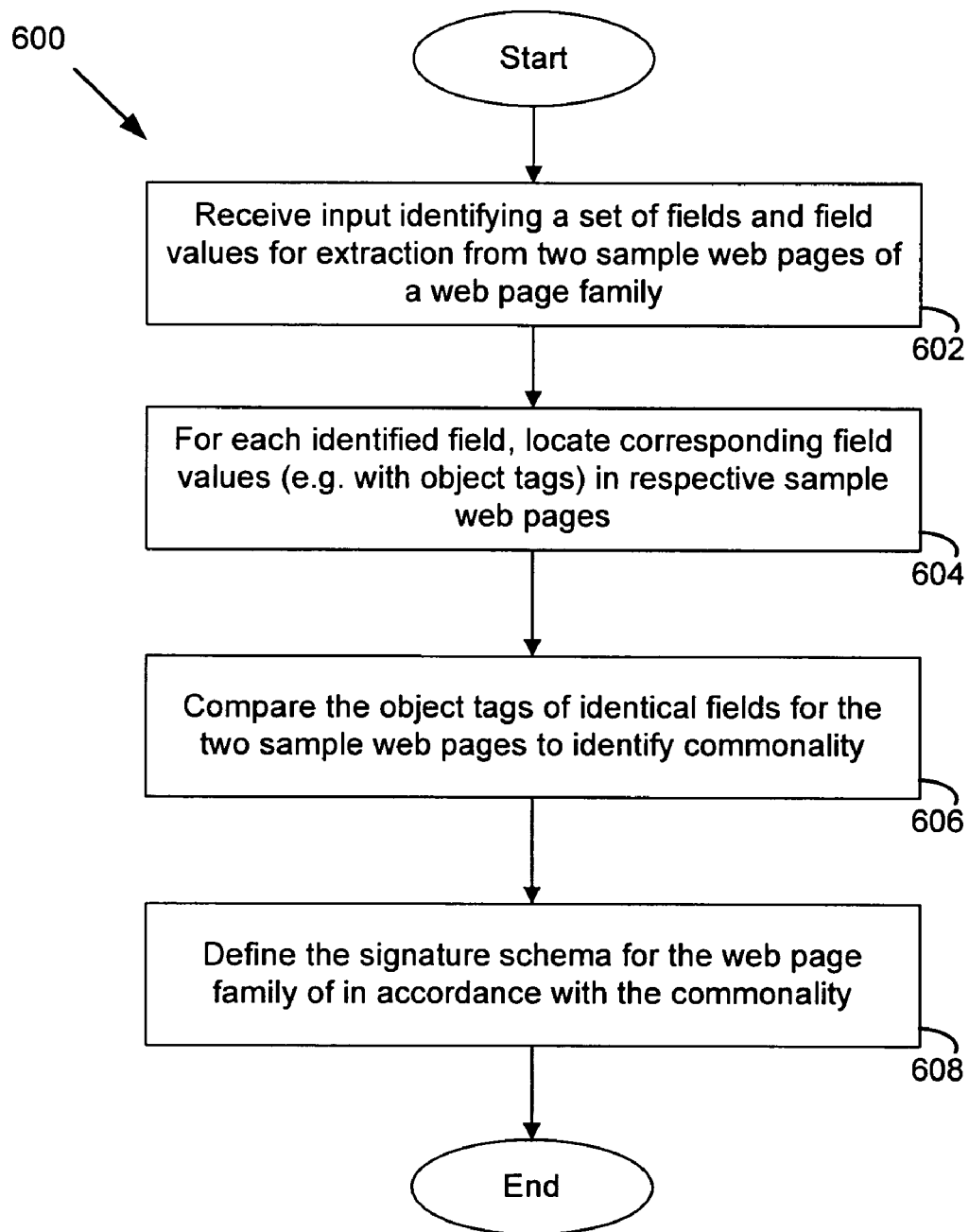
FIG. 6 illustrates an exemplary operations of an automatic signature creation tool of the system of FIG. 1.

Referring to FIG. 6 shown are exemplary operations 600 of the automatic signature generation tool 150. A detailed example of two sample web pages used to define a signature schema will be presented below. At 602, the automatic signature generation tool 150 receives an input identifying the desired data that is to be located and extracted, that is, for which signatures and instructions are desired. Tool 150 receives an input identifying a set of fields and corresponding field values for extraction from at least two sample web pages of a web page family. The fields and field values have also been referred to as elements herein. That is, the fields may refer to the categories or attributes by which an object (such as an item for sale) may be defined. For example a product object such as a camera may have the following fields: image, title, price, description. The values for each of the fields related to the camera may be referred to as field values. The field value for the title field may include "BrandX 7.2 MP Digital Camera".

The input identifying the fields and field values for extraction as defined in 602, may be provided by: a manual review of the web page to identify desired fields (e.g. locating the desired image within object tags of a web page) and to indicate the content type of various tags in the web page (e.g. navigation, title, price, image, item description, etc.). Alternatively, the input fields and field values of step 602 may be semi-automated using the desktop tagging tool 160 to highlight portions on the web page and therefore visually select which content data corresponds to what meaning (e.g. to select the elements on a page linked to a field). Further alternately, the desktop tagging tool 160 may be used to automatically populate fields and estimated values for the fields and to allow a user to confirm/correct estimated fields (e.g. by using heuristics or other rules automatically applied in combination with pre-defined locations of fields (e.g. confidence intervals) to web pages to identify likely data) provided by tagging tool 160 or other module (not shown).

At 604, each identified field and corresponding field value is located within object tags of each of the at least two sample web pages. For example, if for the first sample web page, the input received identifies an image field having the value "product_image.gif", then this value is first located within an object tag of the first web page. For example, the object tag may be: <img src="product_image.gif"> and it is the second image object tag (e.g. a second instance of the <img tag) in the code of the web page that contains this object tag. The received input further identifies that for the second web page, the identical field type (e.g. image field) has a value of "sample_image.gif". It is determined that the second image object tag in the code of the web page is associated with the identified image field (e.g. the object tag may be <img src="sample_image.gif">).

At 606, the automatic signature generation tool 150 compares the object tags of identical fields (e.g. image field) between the two sample web pages to identify a commonality between the object tags for the identical fields (such as common location, string identifiers, attribute type, and other patterns (i.e. a pattern comprising characters that describe a set of strings that can uniquely identify a field value)) within the plain text (ASCII) web page code. A pattern may include "string1"*"sting2" where * represent 0 or more characters between the characters of "string1" and "string 2".

In the above example, the commonality between the two identified object tags may be that the object tag was the second instance of the "img" attribute within the code of each web page; that the object for the two sample web pages starts with 'src="' and that '"' ends the string that provides the field value for each object. For example, the object tag of the first web page provided the string "product_image.gif". Further, the object tags corresponding to each web page and having the identical image field type may be identified by the attribute "<img".

At 608, automatic signature generation tool 150 uses the commonality between object tags of identical fields of the two sample web pages to define instructions to locate and extract the desired data, which instructions comprise a portion of the signature schema 122 for web pages of the same family type. Operations 600 may be repeated for each of the identified fields and field values (elements) to determine the commonality and patterns between the two sample web pages, in turn defining signatures and instructions with which to define at least a portion of signature schema 122. Further, operations 600 may be repeated for other web pages of other family types in the web site to generate the instructions to code other respective portions of schema 122.

An example of the operations 602, 604, 606, and 608 will now be described with reference to two illustrative sample web pages (and their illustrative HTML code in Table 6). As described earlier, pre-identified fields and field values indicating the subset of data to be located and extracted from the web page code for this web page family are provided (Table 5) for each of the sample web pages (for operations 602). As also described, the pre-defined fields may either be identified manually by the user or using the desktop tagging tool 160 including estimated locations of the fields to generate the desired fields and field values.

TABLE 5

Example Fields and Field Values of Two Sample Web Pages

| Item1 | |
|---|---|
| Image | Product_image.gif |
| Title | Product Title |
| Price | $79.99 |
| List Price | $99.99 |
| Description | This is a description for Product title made by Product Manufacturer |
| Item2 | |
| Image | Sample_image.gif |
| Title | Sample Title |

TABLE 5-continued

Example Fields and Field Values of Two Sample Web Pages

| | |
|---|---|
| Price | $99.99 |
| List Price | $109.33 |
| Description | This is a description for Sample title made by Sample Manufacturer |

TABLE 6

Example HTML Web Pages Document of the Two Sample Web

```
Item1.html
<html>
<head></head>
<body>
<img src="company_logo.gif" class="image" />
<div class="product">
<h1>Product title</h1>
<h2>Product Manufacturer</h2>
<img src="product_image.gif" />
<br>
List Price: <strong> $99.99 </strong>
<br />
<br>
Our Price: <strong> $79.99 </strong>
<br />
<p>
This is a description for Product title made by Product Manufacturer
</p>
</div>
</body>
</html>
Item2.html
<html>
<head></head>
<body>
<img src="company_logo.gif" class="image" />
<p>
disclaimer
</p>
<div class="product">
<h1>Sample title</h1>
<h2>Sample Manufacturer</h2>
<img src="sample_image.gif" />
<br>
List Price: <strong> $109.33 </strong>
<br />
<br>
Our Price: <strong> $99.99 </strong>
<br />
This is a description for Sample title made by Sample Manufacturer
</p>
</div>
</body>
</html>
```

As noted, automatic signature generation tool 150 repeats operations 602-608 for each of the input fields (e.g. image, price, title, description) to define a commonality between the web page code (e.g. tags etc.) used to describe each of the respective fields and thereby define the signature schema 122 for that field.

Step 1—Identify the Image Field and Field Value in the Sample Web Pages

First, the automatic signature generation tool 150 examines the web page code of Item1 for the identified image field <img src="product_image.gif"/>. Tool 150 may initially identify "src" as an attribute corresponding to the image field and scan the source (HTML document) of the Item1 web page for src="product_image.gif". It does find a match (as it ought to since the field was previously selected from this code) and the location thereof. It then scans item2 but no match is found in item2. Next the automatic signature generation tool looks at "<img" within the source document of item1. It determines that it is the second match (corresponding to the "img" attribute). Once the object tag corresponding to the image field and field value has been located within item1, the automatic signature generation tool 150 examines Item2 for the image field having value of sample_image.gif. When looking at Item2, the second object tag having the image attribute also provides the object that contains the image. Now that a matching object corresponding to the same field type (e.g. image) has been found, a similar heuristic is used by the automatic signature generation tool 150 to locate the result from within the object. If the object is a text node, the process is complete. Text nodes are easily distinguished by their respective tags in the code. Otherwise, the start and end of the object corresponding to the image field may need to be located. Using pattern recognition techniques, it is found that the pattern 'src="' starts the string and that '"' ends the string. Therefore the following entry may be added to the signature schema 122 for defining the image field.

```
<lookup type="pex" action="get_string" name="image" ref="<img "
    repeat_ref="1" start=" src="" end=""" />
```

Step 2—Identify the Title Field and Field Value for Each Sample Web Page

From Item1 the object <h1>Product title</h1> is selected by the automatic signature generation tool 150 based on the identified fields to review. Tool 150 identifies that it is a text node within the code and looks to its parent to identify uniqueness. There are no attributes for the parent <h1>. Next the automatic signature generation tool 150 looks at "<h1" within Item1. It determines that it is the only match. When looking at Item2, there is only one match, and the matching object tag contains the title. Now that the automatic signature generation tool 150 has obtained the matching object for the title field in each of the sample web pages, a similar heuristic is applied to locate the result from within the object. Since the object is a text node, the process is complete. Therefore the following entry may be added to the signature schema 122 for defining the title field of a web page.

<lookup type="pex" action="get_string" name="title" ref="<h1" start=">" end="<"/>

Step 3—Identify the Price Field and Field Value for Each Sample Web Page

From Item1 the object <strong> $79.99 </strong> is selected by the automatic signature generation tool 150. There are no attributes to be checked for this element. Next the element looks at "<strong" within Item1. It determines that it is the second match that contains the desired price ($79.99). When looking at Item2, the second strong tag also provides the object that contains the price. Since the object is a text node, the process is complete. Therefore the following entry may be added to the signature schema 122 for defining the Price field of a web page:

```
<lookup type="pex" action="get_string" name="price"
    ref="<strong" repeat_ref="1" start=">"
    end="<" />
```

Step 4—Identify the List Price and the List Price Value for Each Sample Web Page From Item1, the object <strong> $99.99 </strong> is selected by the automatic signature generation tool 150. There are no attributes to be checked for this element. Next the signature generation tool 150 looks at "<strong>" within Item1. It determines that it is the first match that corresponds to the selected object that contains the desired list price field and value. When looking at Item2, the first strong tag also provides the object that contains the list price field and value. Since the object is a text node, the process is complete. Therefore the following entry would be added to the signature schema 122 for defining the List Price field of a web page:

<lookup type="pex" action="get_string" name="price" ref="<strong" start=">" end="<"/>

Step 5—Identify the Description and the Text Value for the Description Field for Each Sample Web Page From Item1 the next identified field for automatic signature generation tool 150 is object "<p> provides a description for Sample title made by Sample Manufacturer </p>". This object represents the pre-identified Description field and field value of Item1. There are no attributes to be checked for this object. Next the signature generation tool 150 looks at "<p>" within Item1. It determines that it is the first match that contains the desired description field and field value. When looking at Item2, the first <p tag does not provide the object that contains the desired description (e.g. "This is a description for Sample title made by Sample Manufacturer"). The parent object <div class="product"> is selected next by the automatic signature generation tool. It identifies the attribute class="product", and scans Item1, and determines that it is the only match. The <p tag is processed again, limiting its search to the parent. The <p tag is identified as the first instance within the parent in Item1. Next the same process is performed on Item2. First the attribute class="product" is located. The first <p tag that is a child of the object containing class="product" is found. The <p object also contains the desired description (e.g. "This is a description for Sample title made by Sample Manufacturer". Since the object is a text node, the process is complete. Therefore the following entry would be added to the signature schema 122 for defining the description of a web page:

<lookup type="pex" action="get_string" name="description" ref="class="product"" start="<p>" end="<" />

Accordingly, as illustrated in Step 5 of the example above, in one embodiment, the automatic signature generation tool 150 examines the HTML document (or other format of web page) and constructs a programmatic data structure to model a hierarchy of the tags. The resulting structure may be a tree, which defines the parent, siblings and children of each object. The operations may identify the key objects that contain the data required for the signature schema document 122. Once a particular object is identified as being a desired data field (i.e. is one of the fields in Table 5), the uniqueness of the object may be identified by examining its properties (for example class, style, id) within the structure. If the properties of the object are not unique, then the task to identify the uniqueness for the object would expand to its parent, siblings and children. For example, if the object is a text node of the tree (or other hierarchical structure), the object may use the properties of its parent to assist with the identification of is uniqueness for expression as a signature. The operations may expand in all directions uniformly (i.e. examine parent, then previous sibling, then next sibling, then first child). The properties of each of these items may also be merged with the desired object to build out the uniqueness. This process would then be repeated on the parent, then the previous sibling, etc, until a unique identifier was found. Once a unique identifier is found, an expression would be created for the signature.

Accordingly, in view of the above, the automatic signature generation tool 150 provided by the computing device 128 provides the signature schema 122 for a new web page family using at least two sample web pages. As illustrated in steps 604 and 606, the tool 150 compares two or more delimiters (pertaining to a common schema of the definition of the pages) from each of the sample web pages in order to identify common uses of the delimiters (and their contents). Once identified as a match, the corresponding object, for example, is placed in the hierarchical structure (or other ordered list, etc.) for defining the signature schema 122.

It is recognized that the hierarchy can link entities either directly or indirectly, and either vertically or horizontally. The only direct links in a hierarchy, insofar as they are hierarchical, can be to the entities' immediate superior or to the entities' subordinates, although a system that is largely hierarchical can also incorporate other organizational patterns. Indirect hierarchical links can extend "vertically" upwards or downwards via multiple links in the same direction. Traveling up the hierarchy to find a common direct or indirect superior, and then down again can nevertheless "horizontally" link all parts of the hierarchy, which are not vertically linked to one another. Further, the structure may also be a list implemented using arrays or linked/indexed lists of some sort. The structure may have certain properties associated with arrays and linked lists.

Further, it is recognized that the structure would be represented in the signature file 122 as the entries or instructions as noted above. It is recognized that a user of the device 128 could manually amend or otherwise review the automatically generated signature file 122, as desired.

It will be apparent to a person of ordinary skill in the art that as a web site may be re-designed or otherwise changed such that the code of one or more web page families may be changed or a family added, an existing signature schema may require re-coding to account for the change/addition, as applicable.

It will be apparent to a person of ordinary skill in the art that as a web site may be re-designed or otherwise changed such that the code of one or more web page families may be changed or a family added, an existing signature schema may require re-coding to account for the change/addition, as applicable.

Signature (Transcoding) Engine Syntax

In accordance with a present embodiment, further details concerning the syntax of schema instructions are described.

Lookup Syntax

The lookup tag instructs the engine 140 to perform an insert, delete or query the document contents.

Type: Defines the data type of the lookup. Type may be "pex" for a string expression. Type may also support more advanced options such as regular expressions, API calls, and SQL queries.

Action:

Action="locate_string": Look for a string ("ref" identifier) value within the data. Return true iff the string exists in the data (i.e. the "ref" identifier index>=0).

Action="replace_string": Replace a string within the data with the "ref" identifier.

Action="move_ptr": Remove all characters in the data that exist before the location of the "ref" identifier.

Action="end_ptr": Remove all characters in the data that exist after the location of the "ref" identifier.

Action="get_string" Extract a string based on the location of the "ref", "start", and "end" identifiers.

ID: ID is an identifier of another section within the signature. It allows the result of a query to trigger another set of actions within the signature. This is primarily used when identifying page types. Once a match has been made, specific instructions are executed that are marked with this ID. Recursive data structures (e.g. lists within lists) may also be supported.

Ref: Ref defines the initial identifier that the lookup searches for. If an AND case is required multiple ref identifiers can be used (i.e. ref="string1" ref1="string2"). If an OR case is required ref_[ref identifier]_alt_1 can be used (i.e. ref="string1" ref_alt_1="string2"). To demonstrate (X="1"||Y="2") && (A="8"||B="9") would translate to ref="1" ref_alt_1="2" ref1="8" ref1_alt_1="9".

Repeat_[identifier]: Repeat executes the identifier query additional times. For example, if ref="hello" to set the identifier index at the second occurrence of hello the following tag would be added: repeat_ref="1".

Location:

Location="before": Search the data in a reverse direction, starting from the "ref" identifier. This implies that both the "start" and "end" identifier indexes must be less than the "ref" index.

Location="middle": Search the data in two directions, starting from the "ref" identifier. This implies that the "ref" identifier index is greater than the "start" identifier index and less than the "end" identifier index.

Location="after": Search the data in a forward direction, starting from the "ref" identifier. This implies that both the "start" and "end" identifier indexes must be greater than the "ref" index.

Start: Start is primarily used when action="get_string" and may also be used for replace/remove instructions. The start identifier index will be the start index of the string to extract. If an AND case is required multiple "start" identifiers can be used (i.e. start="string1" start1="string2"). If an OR case is required start_[start identifier]_alt_1 can be used (i.e. start="string1" start_alt_1="string2"). To demonstrate (X="1"||Y="2") && (A="8"||B="9") would translate to start="1" start_alt_1="2" start1="8" start1_alt_1="9". To find the $n^{th}$ match see the repeat syntax.

End: End is primarily used when action="get_string" and may also be used for replace/remove instructions. The end identifier index will be the end index of the string to extract. If an AND case is required multiple "end" identifiers can be used (i.e. end="string1" end1="string2"). If an OR case is required end_[end identifier]_alt_1 can be used (i.e. end="string1" end_alt_1="string2"). To demonstrate (X="1"||Y="2") && (A="8"||B="9") would translate to end="1" end_alt_1="2" end1="8" end1_alt_1="9". To find the $n^{th}$ match see the repeat syntax Max_index: Max_index is used to limit the scope of a query by ensuring that no other identifier index is greater than the "max_index" . . . If an AND case is required multiple "max_index" identifiers can be used (i.e. max_index="string1" max_index1="string2"). If an OR case is required max_index_[max_index identifier]_alt_1 can be used (i.e. max_index="string1" max_index_alt_1="string2"). To demonstrate (X="1"||Y="2") && (A="8"||B="9") would translate to max_index="1" max_index_alt_1="2" max_index="8" max_index_alt_1="9". To find the nth match see the repeat syntax.

Max_Index_Use_Ref: Max_Index_Use_Ref is a Boolean value set to 0 or 1. It is used with Max_index. When set to 0, the "max_index" will begin querying at the beginning of the data. When set to 1, the "max_index" will begin querying from the "ref" identifier index.

Gbl_append_[identifier]: Gbl_append appends a string passed via the url to the identifiers query value Gbl_Repeat_[identifier]: Gbl_Repeat executes the identifier query additional times. For example, if ref="hello" to set the identifier index at the second occurrence of hello the following tag would be added: gbl_repeat_ref="var" where var would be passed in the URL i.e. http://www.e-shop.ca/mobile/fatfree.asp?site= . . . &url= . . . &var=1.

Tolerance: Tolerance is a Boolean value set to 0 or 1. It is used to return an empty string. By default tolerance is set to 0 which enforces that a property be found on a page, otherwise the page will be marked as "invalid" and an appropriate error message returned. When set to one, an empty value is returned for properties that can not be located.

Include_sz: Include_sz is a Boolean value set to 0 or 1 and used with get_string. It is by default set to 0. When set to 1 it includes the "start" value and the "end" value as part of the result.

Include_start: Include_start is a Boolean value set to 0 or 1 and used with get_string. It is by default set to 0. When set to 1 it includes the "start" value as part of the result.

Include_end: Include_end is a Boolean value set to 0 or 1 and used with get_string. It is by default set to 0. When set to 1 it includes the "end" value as part of the result.

Closetag: Closetag is a Boolean value set to 0 or 1 and used when action="get_string". It appends/> to the extracted value.

Strip_Tags: Strip_Tags removes HTML tags from the value and used when action="get_string".

Strip_tags="1": remove all tags.

Strip_tags="2": remove all br and script tags.

Strip_tags="3": remove all tags except replace </p> </li> with <br>.

Strip_tags="4": remove all tags except replace </div> <br> with <br>.

Strip_tags="tag1, tag2, . . . tagN": remove all tag1, tag2, . . . tagN leaving any tag not listed.

Notrim: Notrim is a Boolean value set to 0 or 1 and used when action="get_string". By default all value have white spaced trimmed. When this property is set to 1, white space is not trimmed.

Append: Append is a string value and used when action="get_string". It appends a string to the extracted value.

Prepend: Prepend is a string value and used when action="get_string". It prepends a string to the extracted value.

Upper: Upper is a Boolean value set to 0 or 1 and used when action="get_string". It converts all characters to upper case.

Lower: Lower is a Boolean value set to 0 or 1 and used when action="get_string". It converts all characters to lower case.

Page Syntax

The page syntax extracts the paging information from the data. This allows the end user the ability to change pages just as on the desktop.

Page_variable: Defines unique key that defines a family's paging feature.

Page_start: Defines value of first page in a family's paging feature.
Page_post: Path where paging variable(s) must be transmitted to.
Page_start: Defines value of first page in a family's paging feature.
Page_increment: Defines value that paging increases by for each page in a family's paging feature.
Page_block: Defines unique key that defines a family's paging block feature.
Page_block_size: Defines the size of the family's page block. (i.e. 10 items per page)
Url_append: Append the unique key that defines a family's paging feature and the page number.
Search Syntax
  Make a web site family's search feature functional by specifying details such as what variable to post.
Search_path: Search path where search variable must be transmitted to
Search_variable: Name of search variable which a web site's search feature is looking to read, request, post, etc.
Url_replace: Remove a portion of the url that is specific to posting search parameters
URL Syntax
  The url tag defines global properties for a site, including the url, and name:
<url location="http://www.eshop.ca" key="eshop.ca" name="E-Shop"/>
Name: Name is the name to display when browsing using the gateway 120
Location: Location defines the fully qualified address of the site.
Key: Key is the site.
Advanced Syntax
  The advanced tag defines global properties for the site. This at a minimum includes the path to the initial page of the site.

```
<advanced>
    <index_link value="http://www.eshop.ca" />
    <check_out value="1" />
</advanced>
```

Index_link: Index_link specifies the path to the initial page of the site. This is usually the same page as the location property from the URL syntax. This field is always required.
Append_link: Appends a string value to every URL requested for this site.
No_purchase: No_purchase is a Boolean value 0 or 1. The default value is 0 which implies that an item should contain a purchase link. When true, the purchase link is removed.
No_item: No_item is a Boolean value 0 or 1. The default value is 0 which implies that Item pages should show up in the breadcrumb. When true, the item is not added to the breadcrumb.
Check_out: Check_out is a Boolean value 0 or 1. The default value is 0 which implies that Item purchase link sends the request and control away from the gateway server 120. When true, then a checkout process has been created for use with gateway server 120.
Product_img_width: Product_img_width defines the width of all item images.
Use_cookies: Use_cookies a Boolean value 0 or 1. By default it is set to 0, and cookies are not passed to the site. When true, gateway 120 passes all cookies from client machine 102 to the site 104, and from the site 104 to the client machine.

Page Type Syntax
  The page type is a collection of lookup queries that have an id associated with them. Lookup queries may be processed in a top down fashion. The first successful lookup will trigger another section in the signature schema document. For example, if the following evaluates to true:

```
<page_type>
    <lookup type="pex" action="locate_string"
    name="list_elements" id="mylist_1" ref="<!--" />
</page_type>
```

Then the tag element <list_elements id="mylist_1"> would be executed next.

General Element Syntax
  Elements include list_elements, menu_elements, item_elements, search_elements, form_elements. Each element has an ID. For example a menu element:
<menu_element id="menu_id"/>
The element may contain the following sub containers (settings, actions, elements, paging) which scope resides only within the element. Each element is associated with a specific rendering function.

```
<menu_element id="menu_id"/>
    <settings> </settings>
    <paging> </ paging >
    <elements> </ elements >
    <actions> </ actions >
</menu_element>
```

Settings Syntax
  Settings syntax varies based on the type of element it resides in. Settings allow customizations that only apply to a specific page family.
Black_list-menu_elements: Black_list removes menu items with names that reside in the black list. Each entry is separated delimited (e.g. using two pound characters (##).
Pass_image-list_elements, search_elements: Pass_image adds the image path to the url when requesting an item. The image added to the url will be used as the item image.
Price[n]-item_elements: Price[n] where n is an integer renames the rendered item with name price[n].
Action-form_elements: Overrides the action of a form displayed to the end user.
Handle-form_elements
Handle="display"—display the form to the end user.
Handle="post"—post the form.
Handle="get"—get the form.
Cookie-form_elements: Send additional cookies when posting this form.
Input_[identifier]-form_elements: Input tag adds/modifies a form value with name [identifier] setting its value.
Rename_[identifier]-form_elements: Rename tag renames a form value with name [identifier].
Actions Syntax
  The actions tag primary function is data manipulation. It contains lookup queries that modify data with actions of "move_ptr" or "end_ptr".

```
<actions>
    <lookup type="pex" action="move_ptr" ref="</head>" />
</actions>
```

Persons of ordinary skill in the art will appreciate that alternative embodiments are contemplated. Though not shown, a client machine may incorporate a transcoding engine, applying a signature schema document obtained from a repository such as repository 124 to web pages received from a web site. For example, client machine 102B may be configured with an engine in cooperation with a mini-browser application or plug-in to another application. The engine obtains the schema document to apply against web page content from a particular web site. Communications with the web site may be direct and not via a gateway 120. The transcoding engine may apply the commands from the schema and transcode appropriately for rendering content by the mini-browser or via the plug-in.

Figure 4:
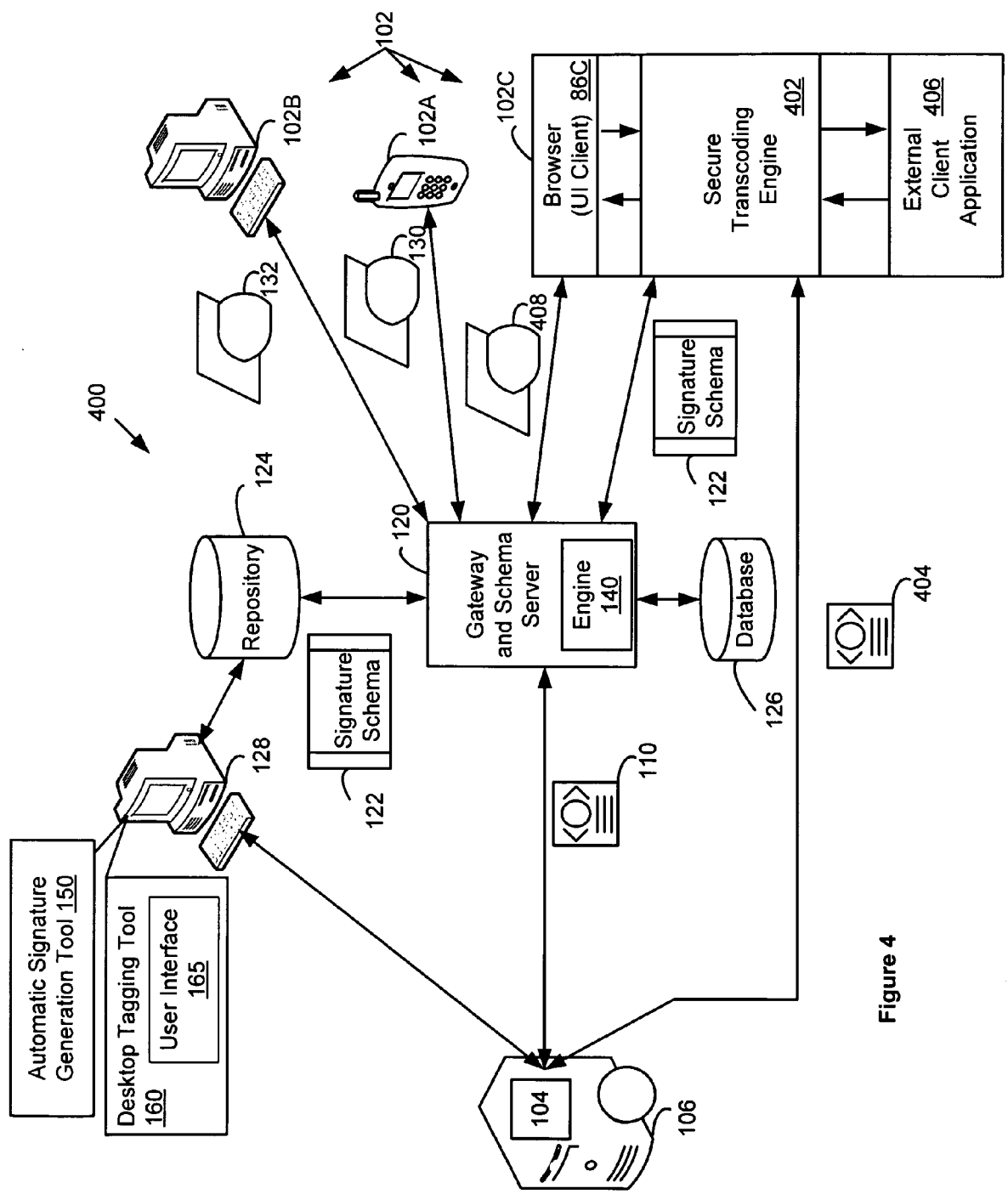
FIG. 4 is a schematic representation of a system for content navigation in accordance with another embodiment.

FIG. 4 illustrates a further embodiment comprising a system 400 for content navigation, similar to system 100 of FIG. 1 but in which a client machine 102C incorporates a secure transcoding engine 402, for example, for communicating directly with web site 104 via secure communications (e.g. Secure Sockets Layer (SSL) or Transport Layer Security (TLS), etc.). Client machine 102C may be a wireless device such as device 102A or wired device 102B comprising components as described with reference to FIG. 2 and as further described with reference to FIG. 4.

Large public database-driven web sites do not typically encrypt data that is publicly available. Instead, the sites encrypt specific pages that contain user information, for example login, signup, checkout, and account management pages. One reason why all content is not encrypted may be that SSL/TLS is resource intensive and reduces scalability. Another reason why all content is not encrypted may be that SSL/TLS increase response times for the end user due to the time spent encrypting and decrypting content. Examples of web sites that follow this model include online stores, news sites, sports information and weather. Therefore, since the number of SSL/TLS pages is relatively small, signature schema can be created to define a mobile friendly layout. Another benefit of the signature schema, is that each field in an HTML form can be classified and populated with user data from an external application. It will be understood that each individual SSL/TLS page will likely require its own respective page family template within a schema.

In contrast to FIG. 1, FIG. 4 shows a client machine 102C comprising a browser application 86C similar to browser 86 for communicating with web site 104 via gateway and schema server 120. In a similar way, a signature schema may be used to transcode un-encrypted communications of web pages 110 to provide transcoded data 408. However, browser 86C may be further configured to communicate through secure transcoding engine 402, handing off communications for secure web pages 404 when such communications between machine 102C and web site 104 are to be encrypted. Secure transcoding engine 402 may communicate with gateway and schema server 120 to obtain the signature schema document 122 which may be applied to transcode secure communications with web site 104.

Figure 5:
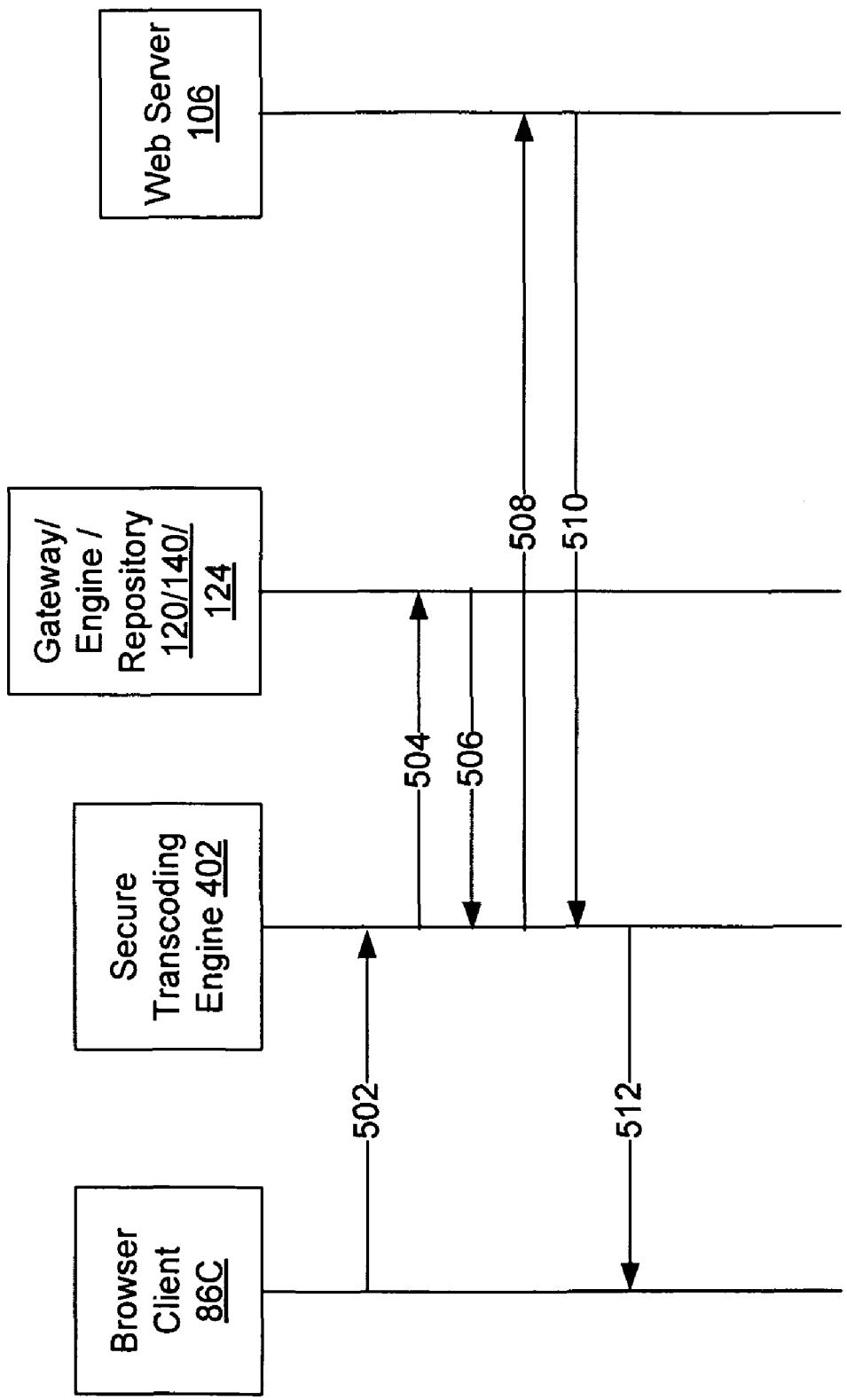
FIG. 5 illustrates a flow of interactions among components of the system of FIG. 4.

FIG. 5 illustrates a flow among client machine 102C, gateway and schema server 120 and web site 104 for secure communications such as for web page 404. It may be presumed that client machine 102C has previously initiated a flow similar to FIG. 3 for a web page 110 that has resulted in transcoded response 408 from gateway and schema server 120 including the actual location of the secure content (e.g. for end to end encrypted communications with site 104 via HTTPs protocols). Browser 86C hands off the request communication (502) to secure transcoder engine 402. Secure engine 402 requests (504) a signature schema 122 from server 120/engine 140. The request may be validated and the schema 122 returned (506) by the engine 140 from schema repository 124 as may be necessary. Secure engine 402 requests 508 the secure content (e.g. 404) via end-to-end encrypted communication from the web server 106. The secure engine 402 receives (510) the secure content 404 from the web server 106, decrypts the content and then invokes the transcoder using the signature schema 122 as instructions to extract the subset of data from the web page 404 and to re-construct the content in a mobile friendly view for rendering by the browser.

Schema document 122 may include instructions for populating secure responses to web site 104 with data previously stored to client machine 102C. Such information may include personal information that has been stored using an external client application 406 such as a password keeping application for securely storing (encrypted) personal information. Schema documents may be coded with suitable instructions to invoke communications or application programming interfaces between the secure transcoding engine and external application 406 to securely obtain such data. Such information may be available via a plug-in (not shown) to browser 86C.

System 100 may be implemented so that a plurality of web sites are coupled to the telecommunication network (either alone by a server 106 or by a plurality of web servers like web-server 106), and that a corresponding plurality of schemas for each of those web sites (or each of the web pages therein, or both) can be maintained by gateway and schema server 120 and repository 124. There can in fact be a plurality of gateway and schema servers (like server 120). Client machines 102 can be configured for proxied connection through different servers 120. Servers 120 can be hosted by a variety of different parties, including, for example but without limitation: a) a manufacturer of client machine 102, b) a service provider that provides access to the telecommunication network on behalf of user U of a client machine 102; c) the entity that hosts web-site 104 or d) a third party intermediary. In web site host example it can even be desired to simply combine the web server 106 and schema server engine 120 on a single server to thereby obviate the need for separate servers.

Accordingly, signature schemas may be defined to provide custom browsing experiences for small (e.g. mobile) devices (among others) and the proposed framework avoids changing web site code for existing web sites. Data extracted from the web sites may be intelligently stored to a relational database using knowledge of the web pages (i.e. the objects and their attributes) incorporated into the signature schemas. Query language may be used to direct a search of the web page as an ASCII text file to look for signatures to distinguish the web page's family (from other web page families of a site) and to identify the subset of data to be extracted.

The invention claimed is:
1. A method of automatically generating transcoding instructions to locate and extract a subset of data from a selected web page of a web site, the method comprising:
receiving an input describing the subset of data, said input comprising one or more data fields and, for each data field, respective field values from at least two sample web pages of a web page family for the web site;

identifying a common pattern among the respective field values for the at least two sample web pages to define a pattern match between the respective data field values, said matching pattern defining a signature for the data field; and generating the transcoding instructions in accordance with the identified common pattern, the transcoding instructions comprising location information of field values for extracting the subset of data within a web page of the web page family, the transcoding instructions for expressing the extracted subset of data in a target format thereby to transcode the web page, wherein identifying the commonality among the respective field values comprises locating the respective field values in the respective web page code.

2. The method of claim 1 wherein identifying the commonality among the respective field values comprises locating object tags within the web page code.

3. The method of claim 2 further comprising constructing a programmatic data structure representing a hierarchy of object tags within the web page code and reviewing the hierarchy to determine the commonality.

4. The method of claim 1 wherein identifying the commonality among the respective field values comprises performing pattern recognition to define a common pattern within the web page code.

5. The method of claim 1 wherein the web page code comprises markup language in plain text.

6. The method of claim 5 wherein each signature comprises characters selected from the plain text of the web page code.

7. The method of claim 1 further comprising automatically defining the input in accordance with a tagging tool that identifies the respective field values from the sample web pages.

8. The method of claim 1 wherein the web site comprises an e-commerce web site for making a purchase.

9. A system for automatically generating transcoding instructions to locate and extract a subset of data from a selected web page of a web site, the system comprising a processor and memory coupled thereto, said memory storing instructions and data to configure the processor for:

receiving an input describing the subset of data, said input comprising one or more data fields and, for each data field, respective field values from at least two sample web pages of a web page family for the web site;

identifying a common pattern among the respective field values for the at least two sample web pages to define a pattern match between the respective data field values, said matching pattern defining a signature for the data field; and generating the transcoding instructions in accordance with the identified common pattern, the transcoding instructions comprising location information of field values for extracting the subset of data within a web page of the web page family, the transcoding instructions for expressing the extracted subset of data in a target format thereby to transcode the web page, wherein identifying the commonality among the respective field values comprises locating the respective field values in the respective web page code.

10. The system of claim 9 wherein identifying the commonality among the respective field values comprises locating object tags within the web page code.

11. The system of claim 10 further comprising constructing a programmatic data structure representing a hierarchy of object tags within the web page code and reviewing the hierarchy to determine the commonality.

12. The system of claim 9 wherein identifying the commonality among the respective field values comprises performing pattern recognition to define a common pattern within the web page code with which to locate the respective field values.

13. The system of claim 9 wherein the web page code comprises markup language in plain text.

14. The system of claim 13 wherein each signature comprises characters selected from the plain text of the web page code.

15. The system of claim 9 further comprising automatically defining the input in accordance with a tagging tool that identifies the respective field values from the sample web pages.

16. The system of claim 9 wherein the web site comprises an e-commerce web site for making a purchase.

17. A computer program product for automatically generating transcoding instructions to locate and extract a subset of data from a selected web page of a web site, the computer program product storing computer readable instructions which when executed by a computer processor configure the processor to:

receive an input describing the subset of data, said input comprising one or more data fields and, for each data field, respective field values from at least two sample web pages of a web page family for the web site;

identify a common pattern among the respective field values for the at least two sample web pages to define a pattern match between the respective data field values, said matching pattern defining a signature for the data field; and generate the transcoding instructions in accordance with the identified common pattern, the transcoding instructions comprising location information of field values for extracting the subset of data within a web page of the web page family, the transcoding instructions for expressing the extracted subset of data in a target format thereby to transcode the web page, wherein identifying the commonality among the respective field values comprises locating the respective field values in the respective web page code.

* * * * *